US007011602B2

(12) United States Patent
Makiyama et al.

(10) Patent No.: US 7,011,602 B2
(45) Date of Patent: Mar. 14, 2006

(54) SHIFT CONTROL FOR CONTINUOUSLY-VARIABLE TRANSMISSION

(75) Inventors: Akihiro Makiyama, Yokohama (JP); Atsufumi Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 65 days.

(21) Appl. No.: 10/704,853

(22) Filed: Nov. 12, 2003

(65) Prior Publication Data

US 2004/0097328 A1 May 20, 2004

(30) Foreign Application Priority Data

| | | | |
|---|---|---|---|
| Nov. 13, 2002 | (JP) | ............................ | 2002-329138 |
| Nov. 13, 2002 | (JP) | ............................ | 2002-329139 |
| Nov. 13, 2002 | (JP) | ............................ | 2002-329140 |
| Dec. 6, 2002 | (JP) | ............................ | 2002-354810 |

(51) Int. Cl.
*B60K 41/12* (2006.01)
*F16H 59/48* (2006.01)

(52) U.S. Cl. ......................... 477/44; 477/120; 477/905

(58) Field of Classification Search .................. 477/37, 477/120, 43–44, 904, 905; 701/55–6
See application file for complete search history.

(56) References Cited

U.S. PATENT DOCUMENTS

| | | | | |
|---|---|---|---|---|
| 4,764,155 | A | 8/1988 | Kumura et al. | |
| 4,996,893 | A * | 3/1991 | Nakamura et al. | 477/120 |
| 5,499,953 | A * | 3/1996 | Hayasaki | 477/120 |
| 5,947,861 | A * | 9/1999 | Nobumoto | 477/37 |
| 6,244,986 | B1 * | 6/2001 | Mori et al. | 477/46 |
| 6,411,878 | B1 * | 6/2002 | Hanawa et al. | 701/51 |
| 6,485,391 | B1 * | 11/2002 | Makiyama et al. | 477/44 |
| 6,547,691 | B1 * | 4/2003 | Hino | 477/37 |
| 2001/0044358 | A1 * | 11/2001 | Taniguchi et al. | 477/44 |
| 2004/0128048 | A1 * | 7/2004 | Iwatuki et al. | 477/37 |

FOREIGN PATENT DOCUMENTS

| | | | |
|---|---|---|---|
| JP | 61-136052 | A | 6/1986 |
| JP | 4-54371 | A | 2/1992 |
| JP | 2002-372143 | A | 12/2002 |

* cited by examiner

*Primary Examiner*—Roger Pang
(74) *Attorney, Agent, or Firm*—Foley & Lardner LLP

(57) ABSTRACT

A shift control apparatus for a continuously-variable transmission includes a controller for controlling a transmission ratio in a normal mode in accordance with a sensed vehicle speed and a sensed accelerator operation condition. The controller determines a second-mode downshift characteristic and a second-mode upshift characteristic in accordance with a driver's acceleration demand; and controls the transmission ratio in a kickdown shift control mode in response to a driver's acceleration request by performing a downshift operation to a target downshift transmission ratio determined according to the second-mode downshift characteristic and an upshift operation according to the second mode upshift characteristic.

27 Claims, 24 Drawing Sheets

SHIFT CONTROL FOR CONTINUOUSLY-VARIABLE TRANSMISSION

BACKGROUND OF THE INVENTION

The present invention relates to technique for shift control of a continuously-variable transmission for a vehicle.

A Published Japanese Patent Application Publication (KOKAI) No. H04(1992)-54371 shows a continuously-variable transmission shift control system arranged to determine a target transmission ratio in accordance with a vehicle speed and an accelerator operation quantity by using a map of shift pattern. In this control system, however, if, during a normal running state with a relatively small accelerator operation quantity and a constant vehicle speed, a driver carries out a kickdown operation with the intention of rapid acceleration, the actual transmission ratio does not immediately reach a target ratio corresponding to the accelerator operation quantity. Consequently, the driving force does not increase immediately whereas the engine speed increases. During this, the engine falls into a state like racing, causing an unpleasant feeling to the driver.

A U.S. Pat. No. 4,764,155 (corresponding to JP2593432B2) discloses a continuously-variable transmission shift control system arranged to restrain a variation of a transmission ratio or hold the transmission ration constant when a driver's acceleration demand is great or when a throttle opening degree becomes greater than a threshold, in order to reduce a time delay from a throttle opening increase to attainment of the feel of acceleration.

SUMMARY OF THE INVENTION

In the shift control system holding the transmission ratio constant before a greater ratio is reached, however, the transmission ratio is held constant until the throttle opening is returned below the threshold or a hysteresis setting region. Therefore, this system cannot vary the transmission ratio properly after the driver's original intention of acceleration is satisfied. In order to restart the variation of the transmission ratio, the driver must release the accelerator pedal greatly.

It is an object of the present invention to provide CVT shift control apparatus and/or process providing acceleration as intended by a driver in the case of a rapid acceleration request such as a kickdown acceleration request.

According to one aspect of the present invention, a shift control apparatus comprises: a continuously-variable transmission; a sensing or input section to sense a vehicle speed of a vehicle and an accelerator operation condition of the vehicle; and a controller. The controller is configured to control an actual transmission ratio of the continuously-variable transmission in a first mode in accordance with the vehicle speed and accelerator operation condition; to determine a second-mode downshift characteristic and a second-mode upshift characteristic in accordance with the accelerator operation condition, and to control the actual transmission ratio of the continuously-variable transmission in a second mode in response to a driver's acceleration request by performing a downshift operation to a target downshift transmission ratio determined according to the second-mode downshift characteristic and an upshift operation according to the second mode upshift characteristic.

According to another aspect of the invention, a shift control process for a continuously-variable transmission, comprises: a first process element of producing a rapid acceleration request signal in accordance with a sensed accelerator operation condition; a second process element of controlling an actual transmission ratio of the continuously-variable transmission in a first mode in accordance with a sensed vehicle speed and an accelerator operation quantity determined from the sensed accelerator operation condition when the rapid acceleration request signal is absent; a third process element of determining a second-mode downshift characteristic and a second-mode upshift characteristic in accordance with the accelerator operation condition, and a fourth process element of controlling the actual transmission ratio of the continuously-variable transmission in a second mode in response to the rapid acceleration request signal, by performing a downshift operation to a target downshift transmission ratio determined according to the second-mode downshift characteristic and an upshift operation according to the second mode upshift characteristic.

According to still another aspect of the present invention, a shift control apparatus comprises: means for detecting a driver's kickdown acceleration request by monitoring variation of an accelerator operation condition; means for controlling an actual transmission ratio of the continuously-variable transmission in a normal mode in accordance with a sensed vehicle speed and a sensed accelerator operation quantity determined from the sensed accelerator operation condition when the kickdown acceleration request is absent; means for determining a kickdown-mode downshift characteristic and a kickdown-mode upshift characteristic in accordance with a driver's acceleration demand estimated by the sensed accelerator operation quantity, and means for controlling the actual transmission ratio of the continuously-variable transmission in a kickdown mode in response to the kickdown acceleration request, by performing a downshift operation to a target downshift transmission ratio determined according to the kickdown-mode downshift characteristic and an upshift operation according to the kickdown-mode upshift characteristic.

DETAILED DESCRIPTION OF THE INVENTION

Figure 1:
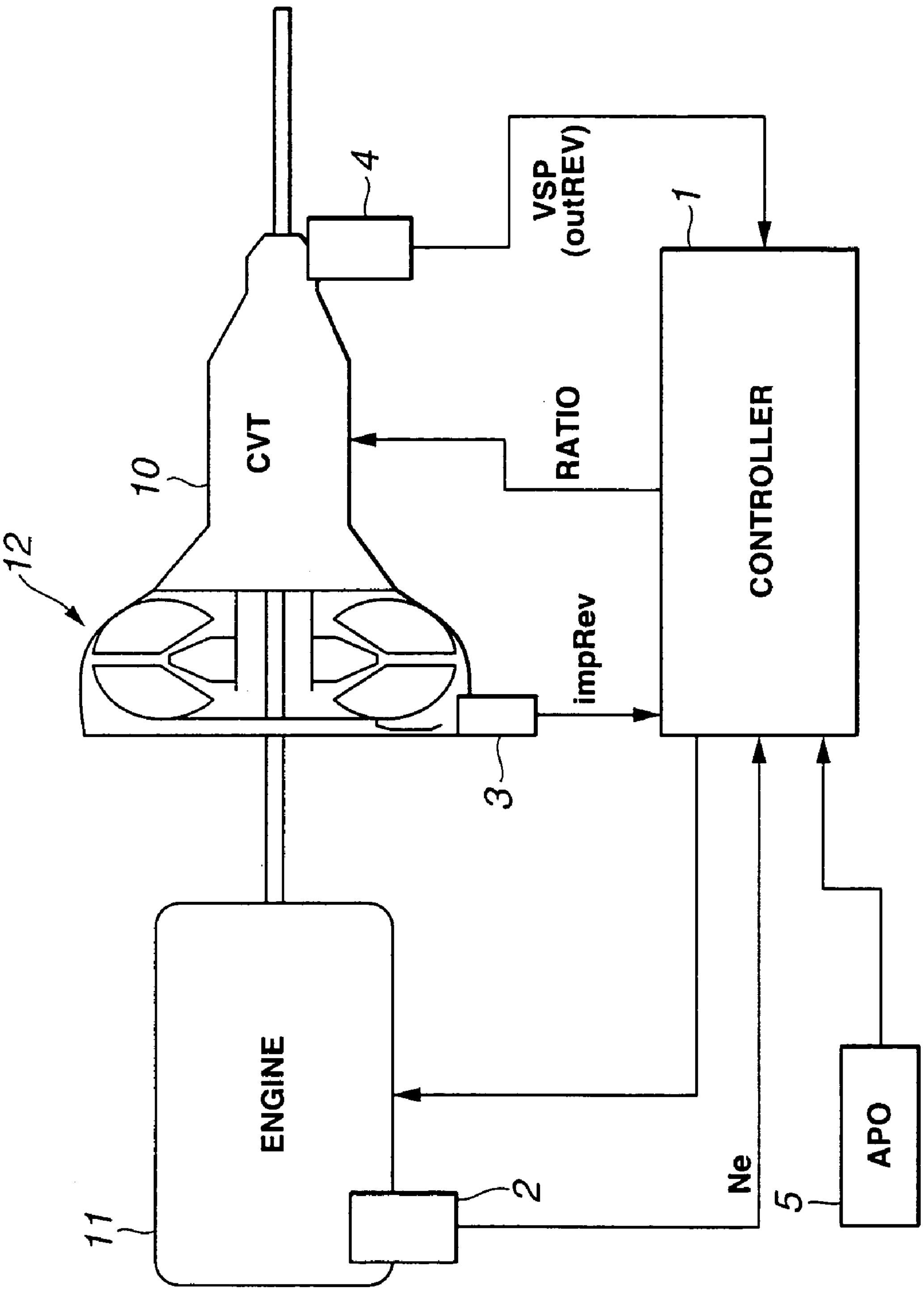
FIG. 1 is a schematic view showing a continuously-variable transmission system according to a first embodiment of the present invention.

FIG. 1 shows a vehicle equipped with a CVT control system according to a first embodiment of the present invention. An engine 11 of the vehicle is connected with a continuously-variable transmission (CVT) 10 provided with a torque converter 12. A controller 1 controls the output of engine 11 and the transmission ratio of CVT 10 so as to provide optimum operating performance in accordance with a vehicle running state. CVT 10 includes a continuously-variable transmission mechanism which may be of a V belt type or a toroidal type.

In accordance with operating conditions, controller 1 controls a fuel injection quantity and an ignition timing of engine 11, and controls the transmission ratio of CVT 10 continuously. Controller 1 serves as engine controlling means and shift controlling means both, and hence functions as a main control unit of an integrated control system.

Input formation on various vehicle operating conditions is supplied to controller 1 from an input or sensing section which includes: An accelerator sensor 5 senses an accelerator operation quantity or accelerator opening APO (representing the position of an accelerator pedal). A vehicle speed sensor 4 senses a vehicle speed VSP of the vehicle. An engine speed sensor 2 senses an engine revolution speed Ne of engine 11. A transmission input speed sensor 3 senses an input shaft speed Nt of CVT 10. In this example, vehicle speed sensor 4 is arranged to sense an output shaft speed OutRev of CVT 10, and the vehicle speed VSP is determined from OutRev by multiplying OutRev by a final reduction ratio and a constant determined by vehicle specification data (such as tire radius).

Figure 2:
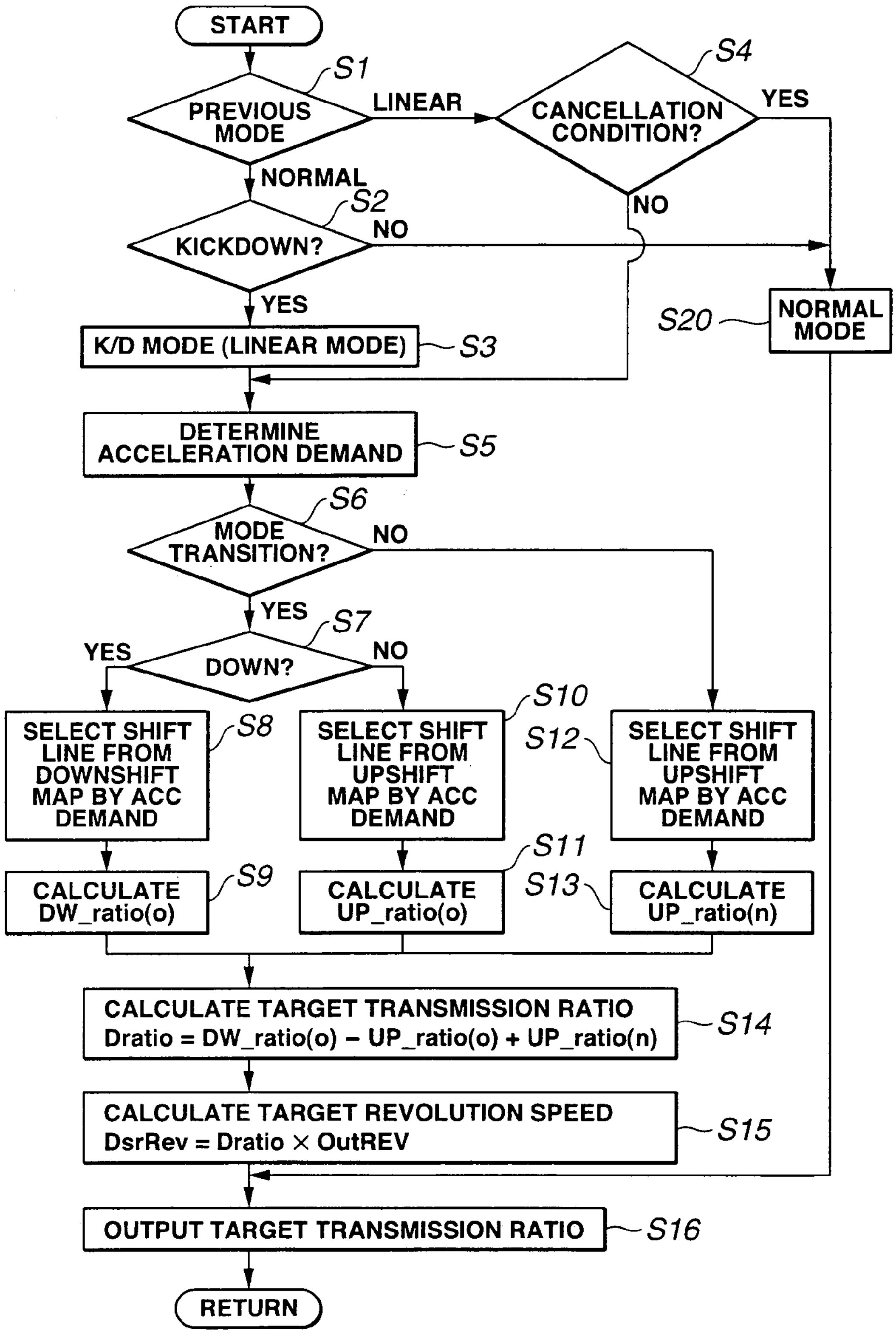
FIG. 2 is a flowchart showing a shift control process performed by a controller shown in FIG. 1.

FIG. 2 shows a shift control process performed by a microcomputer in controller 1 periodically (at regular time intervals of several dozen msec). In this shift control process, controller 1 controls the transmission ratio in accordance with one or more operating conditions normally in a normal mode (S20), and switches the shift control mode from the normal mode to a linear mode (or kickdown mode)(S3) to restrain the change of the transmission ratio when a predetermined accelerating condition (kickdown acceleration) is satisfied. In the background of the control routine of FIG. 2, controller 1 performs sensing operations to determine the accelerator operation quantity APO and vehicle speed VSP as operating conditions.

Step S1 of FIG. 2 determines whether the shift control mode used in a previous cycle is the normal mode or the linear mode, by checking a control flag F. The routine proceeds to step S2 for kickdown check when the previous control mode is the normal mode, and to step S4 for check on condition to cancel the linear mode when the previous control mode is the linear mode. In this example, control flag F represents the linear mode when F=1, and the normal mode when F=0.

Step S2 examines whether a kickdown (K/D) operation is performed or not. In this example, controller 1 first calculates an accelerator operation speed dAPO by determining a difference between a current value of the accelerator operation quantity APO and a previous value of APO. Then, controller 1 determines a reference accelerator speed dAPOL used as a threshold for detecting the kickdown operation, by using a map shown in FIG. 3, from the current vehicle speed VSP and the current accelerator operation quantity APO. By comparing the sensed accelerator operation speed dAPO with the reference dAPOL, controller 1 determines the existence or nonexistence of a kickdown operation. When the sensed accelerator operation speed dAPO is higher than reference dAPOL, then controller 1 determines that a kickdown operation is carried out, and proceeds from S2 to step S3. When dAPO is lower than or equal to dAPOL, controller 1 determines that the accelerator operation is not a kickdown operation, and proceeds from S2 to step S20 to perform the shift control in the normal mode.

Figure 3:
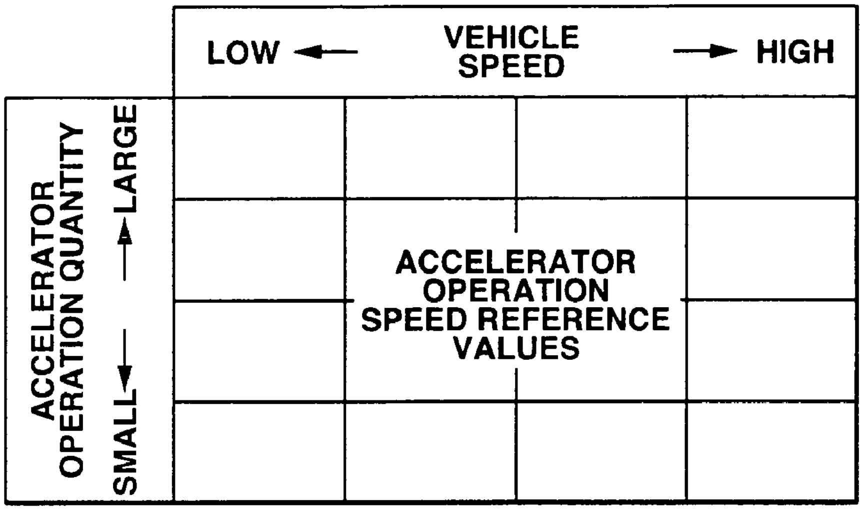
FIG. 3 is a view showing a map used in the shift control process of FIG. 2, for determining an accelerator operation reference speed dAPOL from an accelerator operation quantity APO and a vehicle speed VSP.

The map of FIG. 3 is a rectangular array of reference accelerator operation speed values, designed to obtain a value of the reference accelerator operation speed dAPOL corresponding to the vehicle speed VSP and accelerator operation quantity APO. The map of FIG. 3 contains a value of the reference accelerator operation speed dAPOL in each cell determined by one of divisions of the vehicle speed into which the rage of the vehicle speed is divided, and one of divisions of the accelerator operation quantity into which the range of the accelerator operation quantity is divided.

In the case of kickdown operation, controller 1 sets the control flag F to one (F=1) at S3, and then proceeds to S5 to determine driver's acceleration demand (or driver's acceleration intention).

Figure 4:
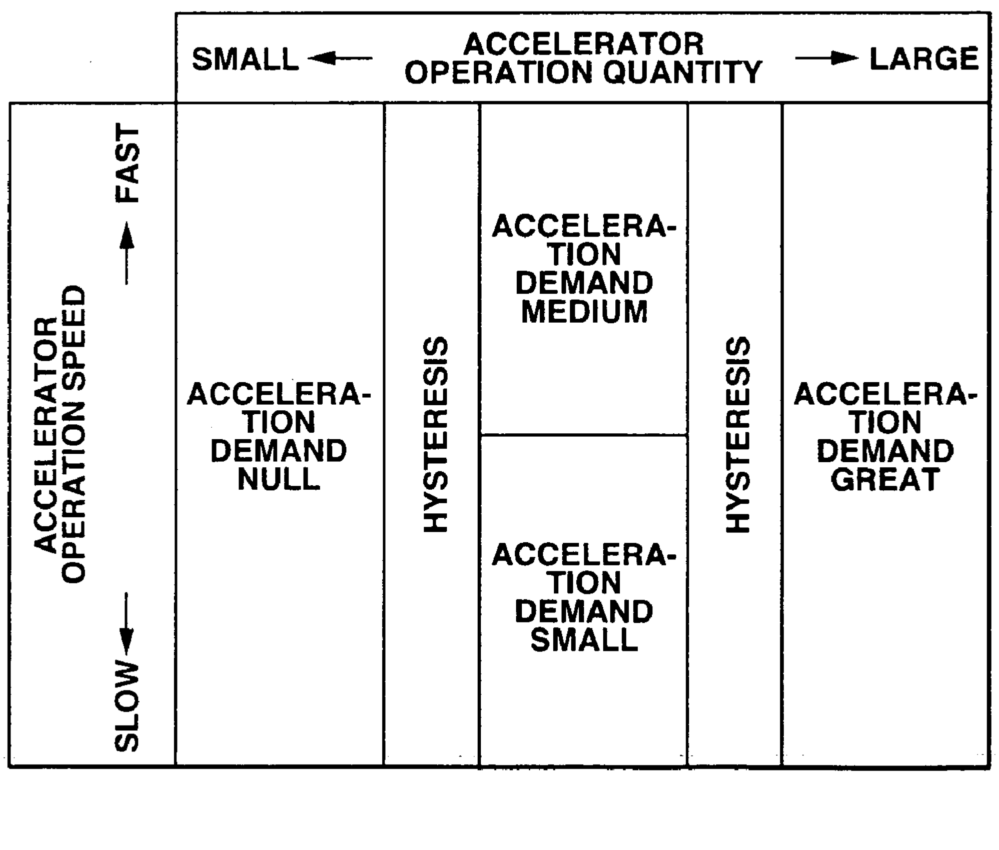
FIG. 4 is a view showing a map used in the shift control process of FIG. 2, for determining a driver's acceleration demand (or intention) from accelerator operation quantity APO and an accelerator operation speed dAPO.

In this embodiment, the driver's acceleration demand (or intention) is determined, at S5, from the accelerator operation speed dAPO determined at S2 and the accelerator operation quantity APO, by lookup from a map shown in FIG. 4. The map of FIG. 4 includes a large acceleration quantity region, a medium acceleration quantity region and a small acceleration quantity region. In the large acceleration quantity region in which accelerator operation quantity APO is large, controller 1 judges that the acceleration demand is great, without regard to accelerator operation speed dAPO. In the medium accelerator operation quantity region in which accelerator operation quantity APO is medium (in the range of APO from 3/8~6/8 in this example), controller 1 judges that the acceleration demand is medium if the accelerator operation speed dAPO is high (fast), and that the accelerator demand is small if the accelerator operation speed dAPO is low (slow). In the small accelerator operation quantity region in which accelerator operation quantity APO is small, controller 1 judges that there is no acceleration demand (or intention) without regard to the acceleration operation speed. In order to prevent undesired hunting in the control performance, the map shown in the example of FIG. 4 includes a hysteresis region providing hysteresis between the large accelerator operation quantity region and the medium accelerator operation quantity region, and a hysteresis region providing hysteresis between the medium accelerator operation quantity region and the small accelerator operation quantity region.

Step S6 following S5 determines whether to change over an operation mode within the linear mode between a downshift operation mode and an upshift operation mode, by checking a mode flag Mf. When mode flag Mf is equal to zero, controller 1 judges that there is a mode transition since a changeover from the downshift mode to upshift mode is not yet completed. When mode flag Mf is equal to one (Mf=1), controller 1 judges that there is no mode transition since a mode changeover from the downshift mode to upshift mode is completed. From S6, controller 1 proceeds to step S7 when there is a mode transition, and to step S12 when there is no mode transition.

In the case of the existence of mode transition, step S7 selects one from the downshift mode and upshift mode.

In this example, controller 1 selects the downshift mode and proceeds to step S8 when a downshift transmission ratio DW_ratio(0) is not set, or when the actual transmission ratio (=input shaft speed impRev/output shaft speed outRev) has not yet reached the downshift transmission ratio DW_ratio (0).

When the actual transmission ratio has reached the downshift transmission ratio DW_ratio(0), controller 1 selects the upshift mode, sets the mode flag Mf to one, and then performs operations of step S10.

Figure 5:
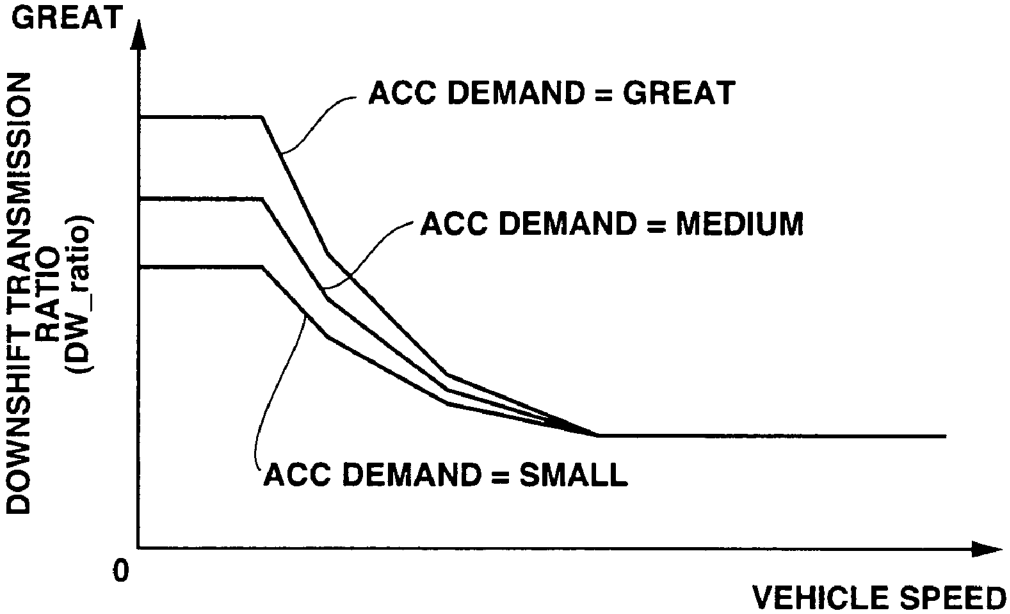
FIG. 5 is a view showing a map used in the shift control process of FIG. 2, for determining a downshift transmission ratio DW_ratio(0) from the vehicle speed, using the acceleration demand as a parameter.

Step S8 for downshift mode selects a shift characteristic corresponding to the driver's acceleration demand (or intention) determined at S5, from a downshift map shown in FIG. 5.

By using the shift characteristic selected at S8, step S9 determines the downshift transmission ratio DW_ratio(0) in accordance with the current vehicle speed VSP, and stores the thus-determined downshift transmission ratio DW_ratio (0) in a memory.

Then, the routine proceeds from S9 to step S14, and step S14 calculates a target transmission ratio Dratio according to the following equation (1).

$$Dratio=DW\_ratio(\mathbf{0})-UP\_ratio(\mathbf{0})+UP\_ratio(n) \quad (1)$$

In this equation, UP_ratio(0) is an initial upshift quantity, and UP_ratio(n) is an (subsequent or follow-up) upshift quantity (the amount of shift to a smaller transmission ratio) corresponding to an increase in the vehicle speed.

At the time of progression from S9 to S14, the initial upshift quantity UP_ratio(0) and the upshift quantity UP_ratio(n) are both equal to zero. Therefore, target transmission ratio Dratio is equal to downshift transmission ratio DW_ratio(0) (Dratio=DW_ratio(0)).

Next step S15 determines a target input shaft speed DsrRev by the following equation (2).

$$DsrRev=Dratio\times OutRev \quad (2)$$

After S15, step S16 controls the actual transmission ratio of CVT 10 by outputting a control signal representing the thus-determined target transmission ratio Dratio.

Step S10 is reached when the upshift mode is selected at S7. Step S10 is a step to select a shift characteristic in accordance with the driver's acceleration demand (or intention) determined at S5, from an upshift map shown in FIG. 6.

By using the shift characteristic selected at S10, step S11 determines the initial upshift quantity UP_ratio(0) in accordance with the vehicle speed VSP, and stores the thus-determined initial upshift quantity UP_ratio(0).

After S11, step S14 calculates the target transmission ratio Dratio by using the equation (1), step S15 calculates target input shaft speed DsrRev by using the equation (2), and step S16 controls the actual transmission ratio of CVT 10 by outputting the control signal representing the thus-determined target transmission ratio Dratio. At the time of progression from S11 to S14, the upshift quantity UP_ratio (n) is equal to 0, and hence the target transmission ratio Dratio is given by:

$$D\text{ratio}=DW\_\text{ratio}(\mathbf{0})-\text{UP\_ratio}(\mathbf{0}).$$

Step S12 is reached when step S6 judges that there is no mode transition. Step S12 selects a shift characteristic in accordance with the driver's acceleration demand (or intention) ascertained at S5, from the upshift map shown in FIG. 6.

By using the shift characteristic selected at S12, step S13 determines the upshift quantity UP_ratio(n) corresponding to an increase in the vehicle speed VSP in accordance with the current vehicle speed VSP. The upshift quantity UP_ratio (n) is updated in next and subsequent cycles.

After S13, step S14 calculates the target transmission ratio Dratio by using the equation (1), step S15 calculates target input shaft speed DsrRev by using the equation (2), and step S16 outputs the control signal corresponding to the thus-determined target input shaft speed DsrRev.

Step S4 is reached from S1 when the previous control mode is the linear mode, and examines whether a predetermined cancellation condition to cancel the linear mode is satisfied or not. In this example, the cancellation condition is satisfied when the accelerator operation quantity APO is decreased, after the setting of the control mode to the linear mode, to a value equal to or smaller than a predetermined level (which is 0/8 in this example), and at the same time a predetermined time has elapsed after the setting to the linear mode. If the cancellation condition is satisfied, controller 1 cancels the linear mode and then proceeds to step S20 to perform the normal mode control. When the linear mode is cancelled, control flag F, mode flag Mf, downshift transmission ratio DW_ratio(0), initial upshift quantity UP_ratio(0), and upshift quantity UP_ratio(n) are all reset to zero.

Figure 7:
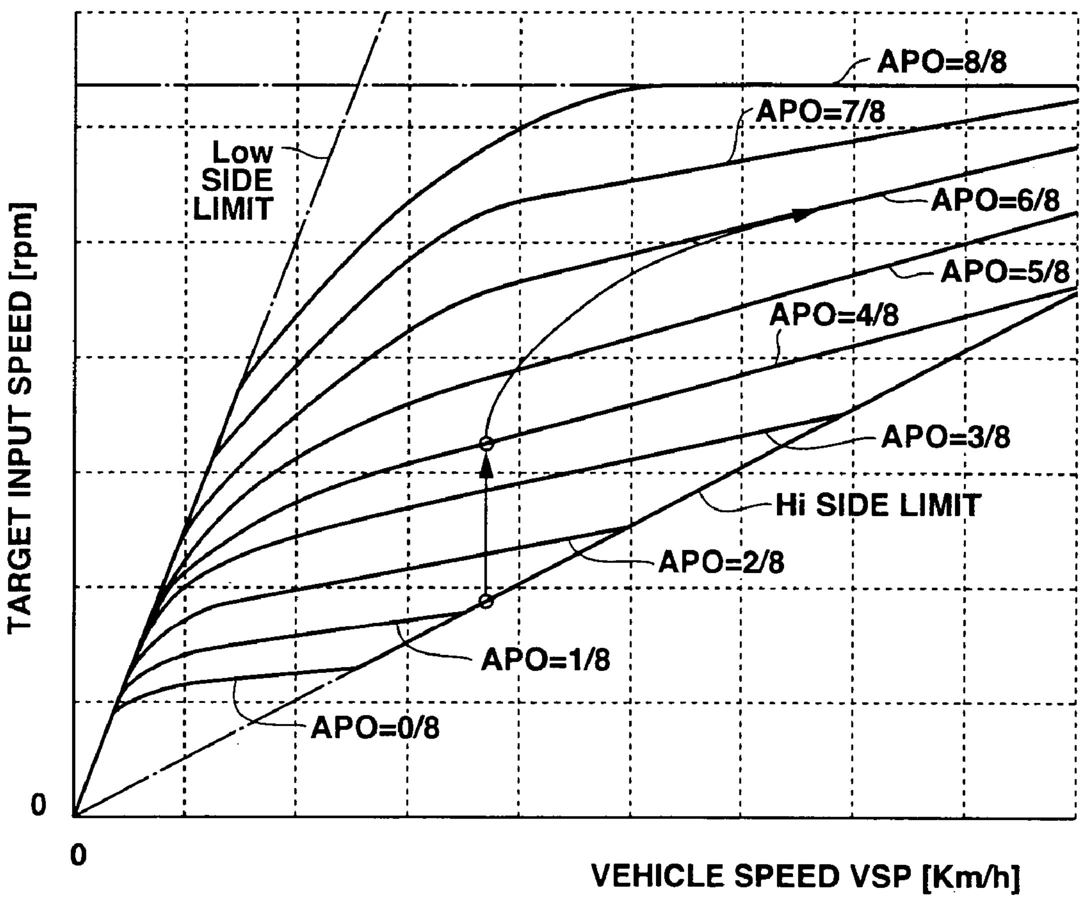
FIG. 7 is a view showing a map used in a normal mode in the shift control process of FIG. 2, for determining a target input revolution speed from the vehicle speed, using the accelerator operation quantity APO as a parameter.

In the normal mode, controller 1 determines the target input shaft speed DsrRev from the current vehicle speed VSP and accelerator operation quantity APO by using a shift map shown in FIG. 7, determines the target transmission ratio Dratio by dividing target input shaft speed DsrRev by the output shaft speed OutRev, and outputs the control signal representing the thus-determined transmission ratio Dratio at S16.

When the accelerator operation quantity APO continues to be equal to or greater than the predetermined level, controller 1 considers that the driver has intention of continuing the acceleration, and proceeds from S4 to S5 to continue the linear mode control.

The thus-constructed shift control system is operated as follows:

When, during a vehicle running operation in the normal mode, the accelerator pedal is depressed and the accelerator operation speed dAPO exceeds reference dAPOL shown in FIG. 3, then the control system changes over the shift control mode to the linear mode, and ascertains the driver's acceleration demand (or intention) by using the map of FIG. 4.

In the first control cycle, mode flag Mf is zero (Mf=0). Therefore, the control system sets the downshift transmission ratio DW_ratio(0) at S8 and S9.

As shown in FIG. 5, this downshift transmission ratio DW_ratio(0) is a function of the vehicle speed, and the downshift map of FIG. 5 includes a plurality of different characteristics (which are three in number in the example of FIG. 5) corresponding to different discrete levels of the driver's acceleration demand (ACC demand). These characteristics are so set that the downshift quantity (the amount of shift toward a greater transmission ratio) is increased as the acceleration demand becomes greater. In each characteristic line, the downshift quantity decreases as the vehicle speed increases.

Figure 8:
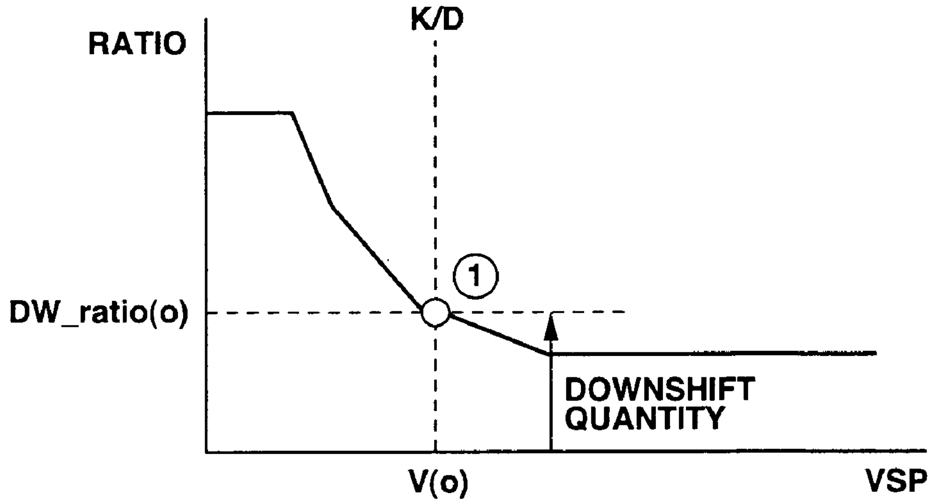
FIG. 8 is a view of the downshift map for illustrating an operation to determine the downshift transmission ratio DW_ratio(0).

The program section of S8 and S9 sets the downshift transmission ratio DW_ratio(0) at the time of occurrence of a kickdown operation, as shown in FIG. 8. In FIG. 8, V(0) is a vehicle speed at the time of a kickdown operation, and DW_ratio(0) is the downshift quantity at the time of the kickdown operation.

Figure 9:
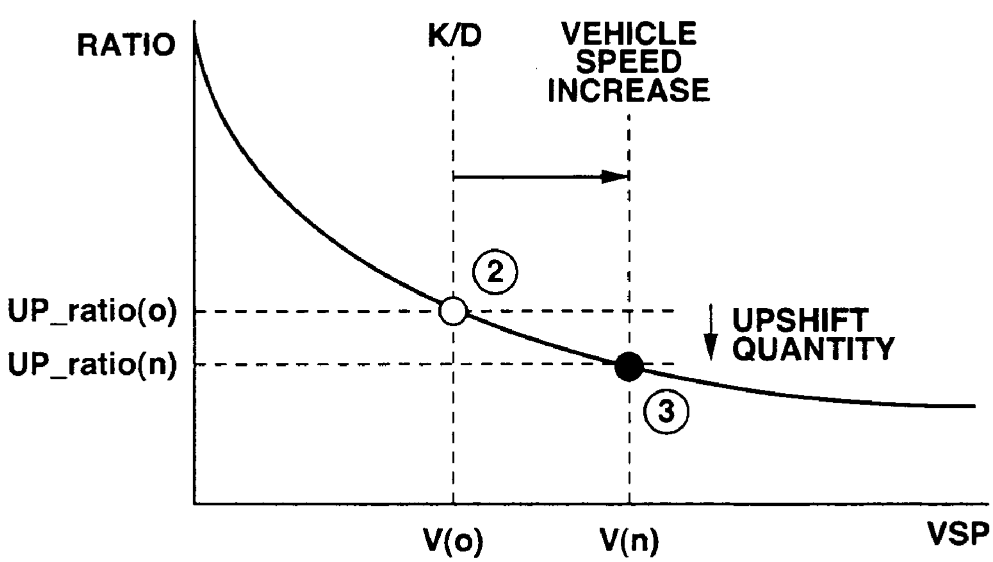
FIG. 9 is a view of the upshift map for illustrating an operation to determine the upshift quantity.

When the actual transmission ratio becomes equal to the downshift transmission ratio DW_ratio(0), the control system sets the initial upshift quantity UP_ratio(0) at the time of completion of the downshift operation, corresponding to the vehicle speed VSP (=V(0)) at the time of the kickdown operation, as shown in FIG. 9, and initiates the upshift mode. The actual transmission ratio at the time of completion of the downshift operation is equal to the target transmission ratio at the time of the kickdown operation (which is equal to the downshift transmission ratio DW_ratio(0)). Therefore, the initial upshift quantity UP_ratio(0) is set to a value corresponding to the target transmission ratio at the time of the kickdown operation. In FIG. 9, UP_ratio(0) is the upshift quantity (initial value) at the time of the kickdown operation, V(n) is a vehicle speed during the kickdown acceleration, and UP_ratio(n) is the (subsequent or follow-up) upshift quantity during the kickdown acceleration.

Figure 6:
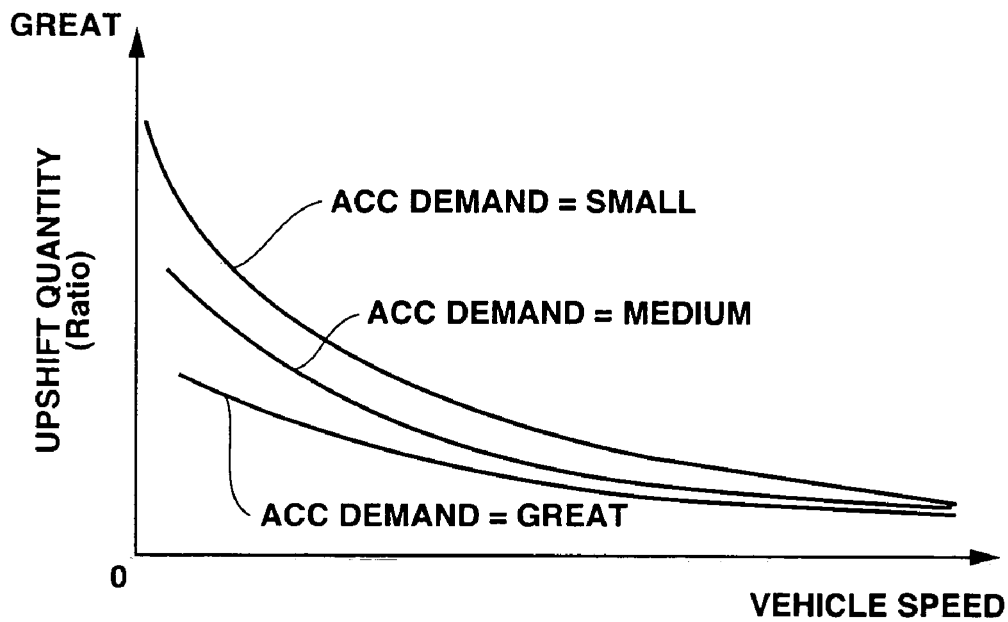
FIG. 6 is a view showing a map used in the shift control process of FIG. 2, for determining an upshift quantity from the vehicle speed, using the acceleration demand as a parameter.

This initial upshift quantity UP_ratio(0) is determined according to one of the shift characteristics shown in FIG. 6 so that the upshift quantity is decreased with increase in the acceleration demand. Thus, the control system starts the upshift operation to a smaller transmission ratio (to the Hi side) determined by the upshift quantity according to the equation (1). Then, the control system updates the upshift quantity UP_ratio(n) every control cycle in accordance with an increase in vehicle speed VSP until the linear mode cancellation condition is satisfied.

Figure 12:
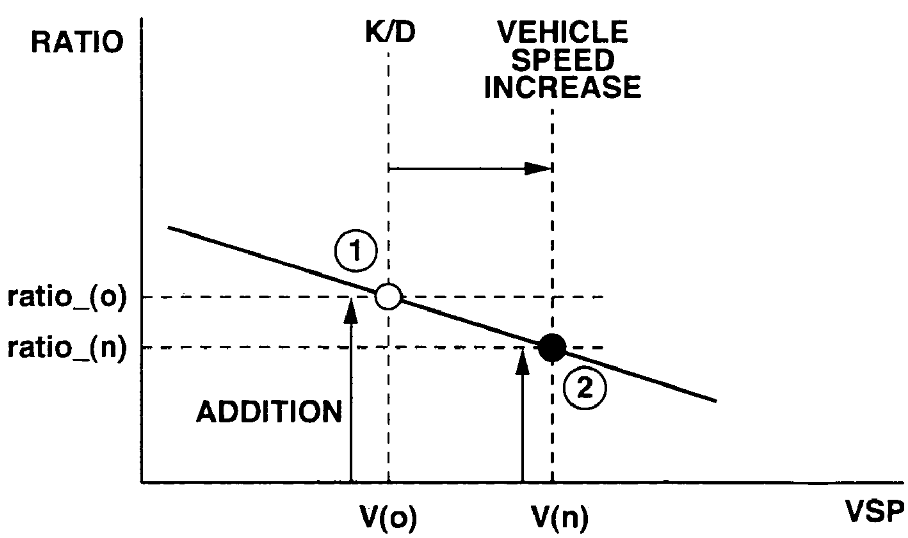
FIG. 12 is a view of a map for illustrating an operation to determine downshift and upshift quantities in the comparative example.

FIG. 12 shows operations of a control system in a comparative example (as disclosed in Japanese Patent Application Publication Kokai No. 2002-372143 published on Dec. 26, 2002; Application No. 2001-182803) arranged to respond to a driver's kickdown operation by determining a downshift quantity in an early stage of the acceleration, and an upshift quantity after the downshift in accordance with a driver's acceleration intention. However, the control system of the comparative example determines the kickdown downshift quantity and the kickdown upshift quantity by using a single map of a shift correction quantity decreasing linearly with increase in the vehicle speed as shown in FIG. 12, including the driver's acceleration intention as a parameter. As a result, the flexibility of setting the target transmission ratio or the target input shaft speed is low, and hence the control system cannot provide acceleration feeling conformable to driver's intention in some operating situations.

Figure 10:
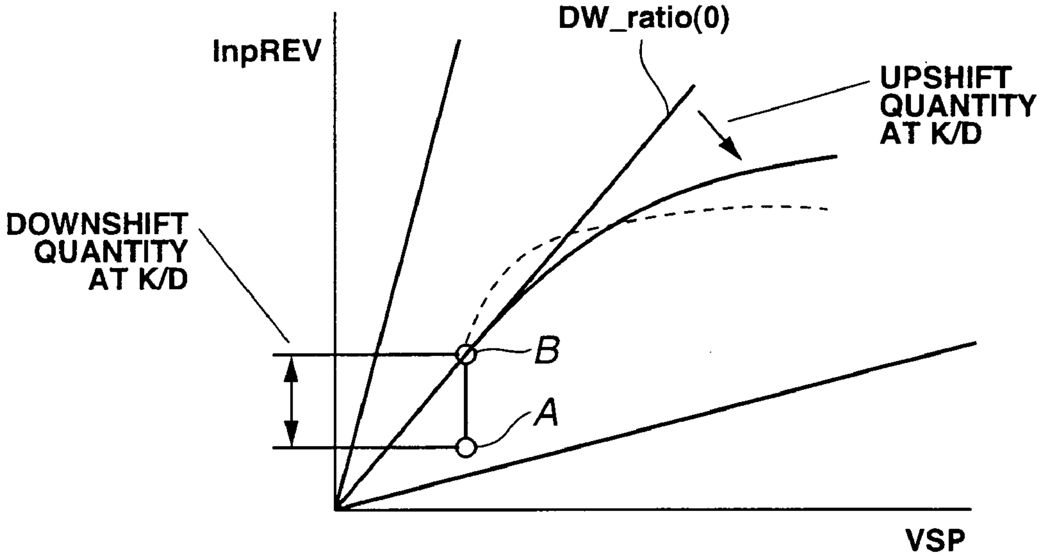
FIG. 10 is a view of a map of an input shaft speed inpRev dependent on vehicle speed VSP in a kickdown acceleration, with a solid line showing behavior of the input shaft speed inpRev in the case of the control system shown in FIGS. 1 and 2, and a broken line showing behavior in the case of a comparative example.

As shown in FIG. 10, by contrast, the control system according to the first embodiment restrains the downshift quantity in the downshift mode immediately after a kickdown operation, as compared to the shift characteristic in the normal mode shown in FIG. 7, by using the map of FIG. 5. Therefore, the control system restrains a change in input shaft revolution speed impRev to an amount between a point A and a point B shown in FIG. 10. Thus, in the early stage of the acceleration, the control system can improve both the magnitude of the vehicle acceleration and the response of the vehicle acceleration.

After the actual transmission ratio has become equal to the target downshift transmission ratio DW_ratio(0), the control system performs the upshift operation by using the initial upshift quantity UP_ratio(0) equivalent to the amount at the time of the kickdown operation and the upshift quantity UP_ratio(n) determined by an increase in vehicle speed VSP so that an upshift quantity UPratio becomes equal to a difference between UP_ratio(0) and UP_ratio(n). That is;

$$UPratio=UP\_ratio(\mathbf{0})-UP\_ratio(n) \quad (3)$$

Equation (3) is obtained by rearranging equation (1) as:

$$Dratio=DW\_ratio(\mathbf{0})-\{UP\_ratio(\mathbf{0})-UP\_ratio(n)\}$$

Therefore; Dratio=DW_ratio(0)−UPratio

Thus, the difference resulting from subtraction of the upshift quantity UPratio from the downshift transmission ratio DW_ratio(0) becomes the target transmission ratio, and the transmission ratio is varied gradually to the upshift side toward a smaller transmission ratio, with increase in vehicle speed VSP after point B in FIG. 10 as shown by a solid line. Therefore, the shift control system restrains an excessive increase of engine speed Ne, and an undesired decrease of the vehicle acceleration, and thereby provides adequate vehicle acceleration responsive to the driver's intention of acceleration.

In FIG. 10, the vertical distance between points A and B corresponds to a downshift quantity at K/T which is a downshift quantity in the kickdown control mode. This downshift quantity at K/D is determined by a point ① shown in FIG. 8. With this downshift quantity at K/D, the control system can control the height of the vehicle acceleration G and the response of G in the early stage of the acceleration. An upshift quantity at K/D shown by an arrow in FIG. 10 is determined by UPratio (=[Value of point ②]−[Value of point ③]). With this upshift quantity K/D, the control system can control the increase in the revolution speed and the decrease of G during the acceleration.

As shown by a broken line curve in FIG. 10, the downshift quantity in the control system of the comparative example is greater than the downshift quantity at point B in the control system of this embodiment. Thereafter, the upshift quantity to the upshift side becomes excessive as compared to the control system according to the embodiment of the present invention.

Figure 11:
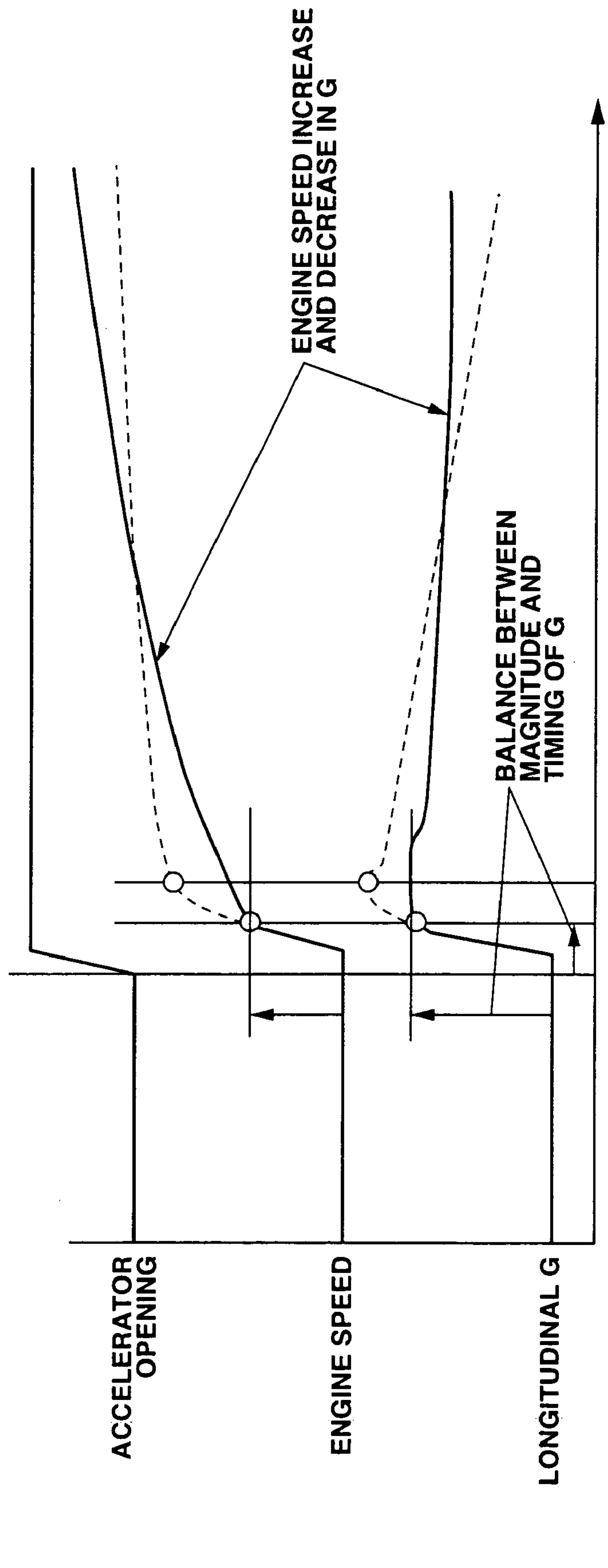
FIG. 11 is a graph illustrating time variation of accelerator operation quantity APO, engine speed and vehicle longitudinal acceleration (longitudinal G) in the kickdown acceleration, with solid lines for the control system shown in FIGS. 1 and 2, and broken lines for the comparative example.

As a result, as shown in FIG. 11, the vehicle acceleration reaches a maximum sooner as shown by solid lines in the embodiment than in the comparative example. Moreover, the engine speed Ne at the time of the maximum acceleration is restrained at a lower engine speed level than a level of the comparative example. Thus, the control system according to the first embodiment can adjust the magnitude of the vehicle acceleration and the time until the maximum acceleration so as to achieve optimum performance. In the upshift mode, the control system restrains the decrease in the transmission ratio as compared to the comparative example, so that the engine speed increases securely, the vehicle acceleration does not decrease too much, and the driver can feel continuation of acceleration.

In the kickdown (K/D) mode or linear mode in the case of a kickdown operation, the control system determines the shift characteristic on the downshift side and the shift characteristic on the upshift side in accordance with the driver's intention of acceleration. Therefore, it is possible to set the engine speed Ne flexibly to the kickdown acceleration request at each vehicle speed level. By the use of a plurality of shift characteristics corresponding to different levels of the driver's acceleration demand, the control system can secure optimum balance between rise and decrease of the vehicle acceleration with reduced load of the computation in controller 1, and achieve optimum kickdown acceleration in a wide speed range.

In the upshift operation after the downshift operation, the upshift quantity dependent on VSP is decreased with increase in the acceleration demand, as shown in FIG. 6. Therefore, the control system according to this embodiment can increase the engine speed in accordance with the magnitude of the acceleration demand, and provide vehicle acceleration as expected by the driver.

Figure 13:
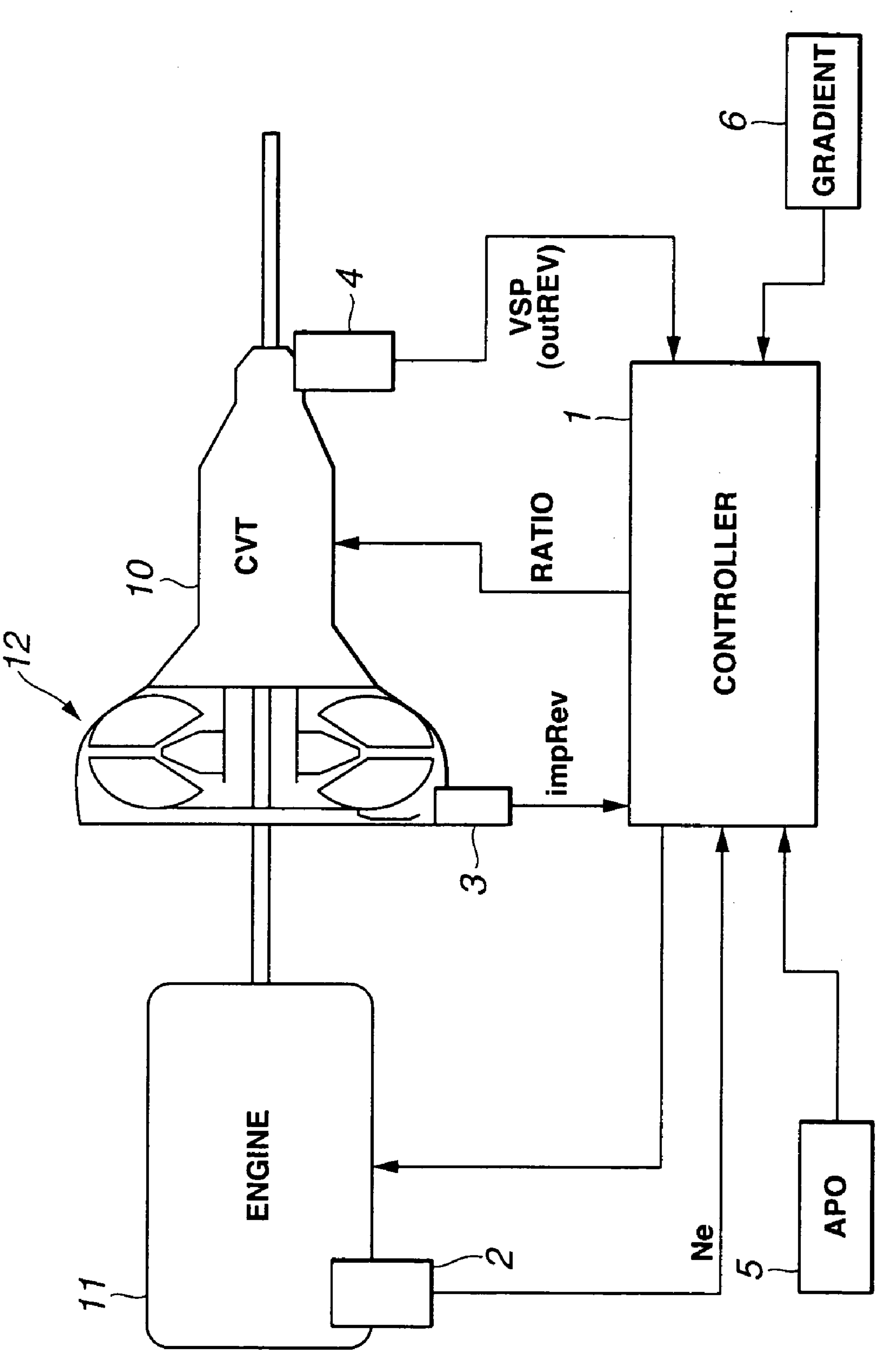
FIG. 13 is a schematic view showing a continuously-variable transmission system according to a second embodiment of the present invention.

FIG. 13 shows a vehicle equipped with a CVT control system according to a second embodiment of the present invention. The control system of FIG. 13 is almost the same as the control system of FIG. 1. Unlike the system of FIG. 1, the input or sensing section of the control system of FIG. 13 additionally includes a gradient sensing device 6 serving as means for sensing a running resistance. In the other respects, the control system of FIG. 13 is identical to the control system of FIG. 1.

Figure 18:
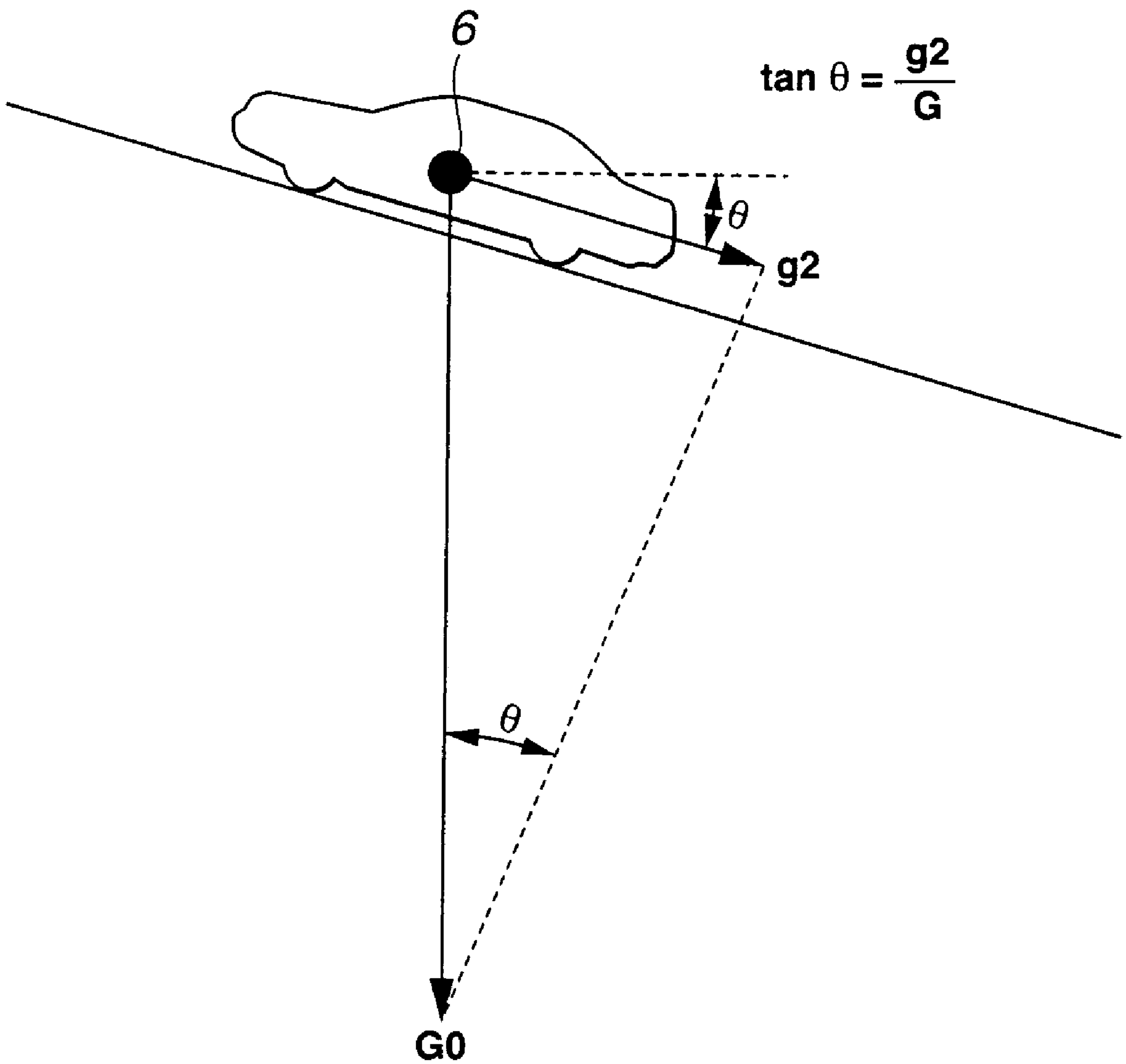
FIG. 18 is a view for illustrating a device 6 for determining a road gradient from a vehicle acceleration, used in the control system of FIG. 13.

Gradient sensing device 6 of this example includes an acceleration sensor or G sensor for sensing the vehicle longitudinal acceleration g. A vehicle longitudinal acceleration g2 corresponding to a running resistance due to the road gradient is determined by subtracting a longitudinal acceleration g1 due to variation of vehicle speed VSP, from the sensed longitudinal acceleration g (that is, g2=g−g1). As shown in FIG. 18, the road gradient θ is determined from the longitudinal acceleration g2 and the gravitational acceleration G0 by using the following equation; tan θ=g2/G0. In this example, gradient θ indicates uphill gradient when gradient θ is positive. The vehicle longitudinal acceleration g1 due to the variation of vehicle VSP is determined by derivative (rate of change) of vehicle speed VSP.

Figure 14:
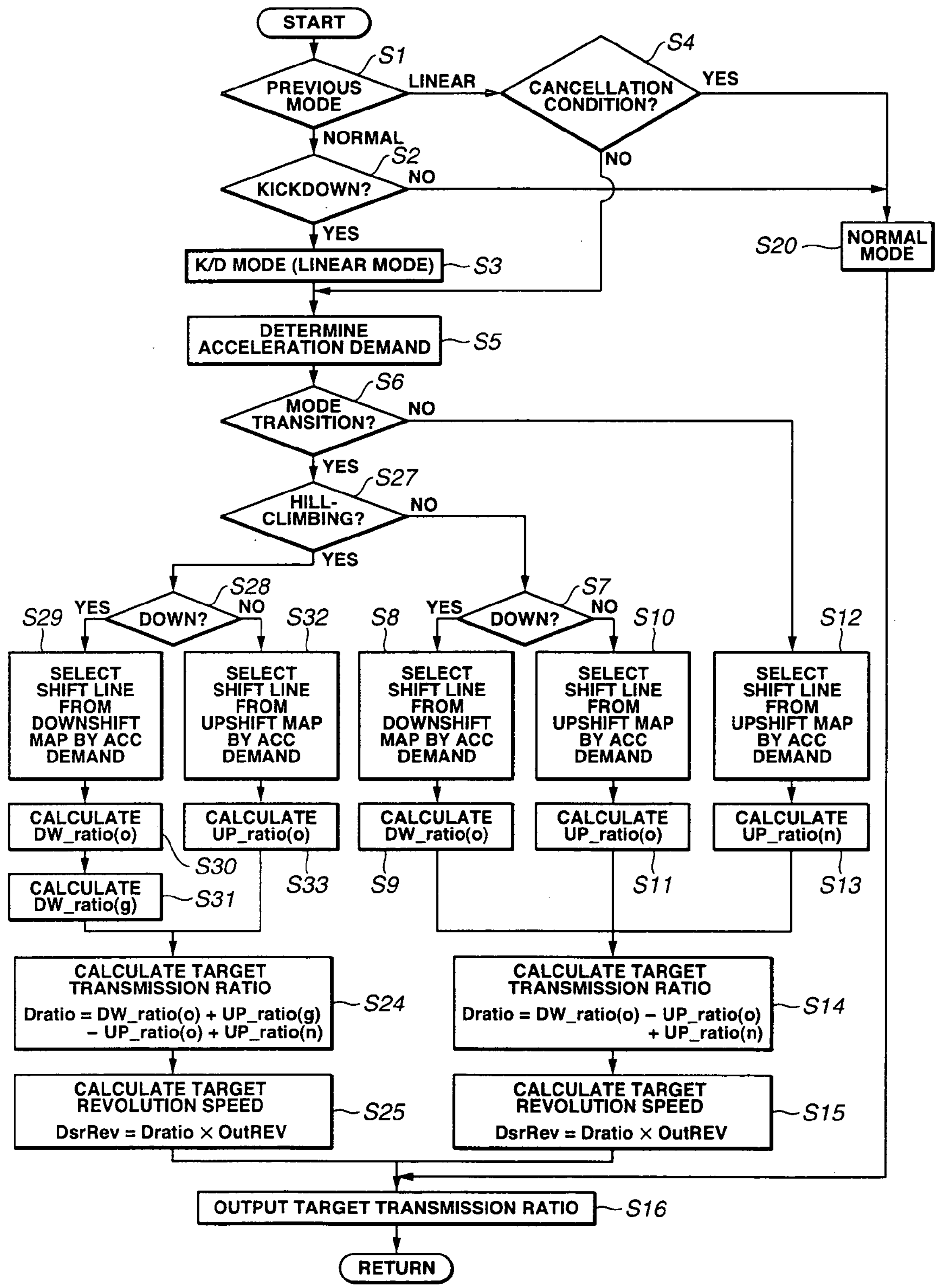
FIG. 14 is a flowchart showing a shift control process performed by a controller shown in FIG. 13.

FIG. 14 shows a shift control process performed periodically by controller 1 of the control system shown in FIG. 13. Steps S1~S16 and S20 in FIG. 14 are substantially identical to the corresponding steps in FIG. 2. In FIG. 14, a program section of steps S27~S35 is added between S6 and S16.

As in the control process of FIG. 2, controller 1 determines, at S1, whether the previous shift control mode used in the previous cycle is the normal mode or the linear mode, by checking control flag F. In the case of the previous mode being the normal mode, controller 1 examines, at S2, whether a kickdown (K/D) operation is performed or not, in the same manner as in the process of FIG. 2 using the map of FIG. 3.

When a kickdown operation is detected at S2, controller 1 sets control flag F to one (F=1) at S3, and then determines the driver's acceleration demand (or driver's acceleration intention) at S5, by using the map of FIG. 4 in the same manner as in the process of FIG. 2, in accordance with the accelerator operation condition (APO and/or dAPO in this embodiment).

Then, at S6, controller 1 checks mode flag Mf to determine whether the changeover from the downshift mode to the upshift mode within the linear mode is completed. When Mf=1, controller 1 proceeds from S6 to S12 as in the control process of FIG. 2. When mode flag Mf is in the zero state (Mf=0) indicating that the changeover from the downshift mode to upshift mode is not yet completed, then controller 1 proceeds from S6 to step S27.

At step S27, controller 1 reads the road gradient sensed by gradient sensing device 6, and determines whether the road is uphill ($\theta>0$) or not. From S27, controller 1 proceeds to step S28 in the case of an uphill road ($\theta>0$); and to step S7 for a normal linear mode in the case of a flat road and in the case of a downhill road ($\theta<0$).

When mode flag Mf is in the zero state (Mf=0) indicating that the changeover from the downshift mode to upshift mode is not yet completed, and at the same time the road is downhill or flat, controller 1 determines at S7 whether the shift is to be the downshift mode and the upshift mode as in S7 of FIG. 2.

In this example, controller 1 selects the downshift mode and proceeds to step S8 when the downshift transmission ratio DW_ratio(0) is not set, or when the actual transmission ratio has not yet become equal to the downshift transmission ratio DW_ratio(0).

When the actual transmission ratio has reached the downshift transmission ratio DW_ratio(0), controller 1 selects the upshift mode, sets the mode flag Mf to one, and then performs operations of step S10.

At S8 for downshift mode, controller 1 selects a shift characteristic corresponding to the driver's acceleration demand determined at S5, from the downshift map shown in FIG. 5.

By using the shift characteristic selected at S8, controller 1 determines the downshift transmission ratio DW_ratio(0) in accordance with the current vehicle speed VSP at S9, and stores the thus-determined downshift transmission ratio DW_ratio(0).

Then, at S14, controller 1 calculates the target transmission ratio Dratio according to the before-mentioned equation (1). At the time of progression from S9 to S14, the initial upshift quantity UP_ratio(0) and the upshift quantity UP_ratio(n) are both equal to zero. Therefore, target transmission ratio Dratio is equal to downshift transmission ratio DW_ratio(0) (Dratio=DW_ratio(0)).

At S15, controller 1 determines the target input shaft speed DsrRev by the equation (2). Then, at S16, the control system controls the actual transmission ratio of CVT 10 by outputting the control signal representing the thus-determined target transmission ratio Dratio.

When the upshift mode is selected at S7, controller 1 selects a shift characteristic in accordance with the driver's acceleration demand determined at S5 at S10, from the upshift map shown in FIG. 6.

By using the shift characteristic selected at S10, controller 1 determines the initial upshift quantity UP_ratio(0) in accordance with the vehicle speed VSP at S11, and stores the thus-determined initial upshift quantity UP_ratio(0).

After S11, controller 1 calculates the target transmission ratio Dratio by using the equation (1) at S14, calculates target input shaft speed DsrRev by using the equation (2) at S15, and controls the actual transmission ratio of CVT 10 by outputting the control signal representing the thus-determined target transmission ratio Dratio at S16. At the time of transition from S11 to S14, the upshift quantity UP_ratio(n) is equal to 0, and hence the target transmission ratio Dratio is given by: Dratio=DW_ratio(0)−UP_ratio(0).

When the road is uphill, controller 1 proceeds from step S27 to a program section S28~S35 for shift control in a hill-climbing downshift mode (hill-climbing linear mode).

When mode flag Mf is in the zero state (Mf=0) indicating that the changeover from the downshift mode to upshift mode is not yet completed, and at the same time the road is uphill, controller 1 determines, at S28, whether the shift is to be the downshift mode and the upshift mode as in S7 of FIG. 2.

In this example, controller 1 determines that the control is to be performed in the downshift mode, and proceeds to step S29 when the downshift transmission ratio DW_ratio(0) is not set, or when the actual transmission ratio has not yet become equal to the target transmission ratio Dratio for the downshift operation.

When the actual transmission ratio has reached the target transmission ratio Dratio for downshift, controller 1 determines that the control is to be performed in the upshift mode, sets the mode flag Mf to one, and then performs operations of step 32.

At S29 for the hill climbing downshift mode, controller 1 selects a shift characteristic corresponding to the driver's acceleration demand (or intention) determined at S5, from the downshift map shown in FIG. 5.

By using the shift characteristic selected at S29, controller 1 determines the downshift transmission ratio DW_ratio(0) in accordance with the current vehicle speed VSP at S30, and stores the thus-determined downshift transmission ratio DW_ratio(0) in a memory.

At step S31 following S30, controller 1 calculates a hill climbing correction transmission ratio DW_ratio(g) from the road gradient θ obtained at S27. This hill climbing correction transmission ratio DW_ratio(g) is determined from road gradient θ by using a predetermined function or a map. The hill climbing correction transmission ratio DW_ratio(g) increases as the road gradient θ increases.

Then, controller 1 proceeds from S31 to step S34, and calculates the target transmission ratio Dratio according to the following equation (4).

$$Dratio=DW\_ratio(\mathbf{0})+DW\_ratio(g)-UP\_ratio(\mathbf{0})+UP\_ratio(n) \tag{4}$$

At the time of progression from S31 to S34, the initial upshift quantity UP_ratio(0) and the upshift quantity UP_ratio(n) are both equal to zero. Therefore, target transmission ratio Dratio is given by:

$$Dratio=DW\_ratio(\mathbf{0})+DW\_ratio(g).$$

At next step S35, controller 1 determines the target input shaft speed DsrRev by the before-mentioned equation (2). At S16 after S35, controller 1 controls the actual transmission ratio of CVT 10 by outputting the control signal representing the thus-determined target transmission ratio Dratio.

Step S32 is reached when the upshift mode is selected at S28. At S32, controller selects a shift characteristic in accordance with the driver's acceleration demand determined at S5, from the upshift map shown in FIG. 6.

By using the shift characteristic selected at S32, controller 1 determines the initial upshift transmission ratio UP_ratio (0) in accordance with the vehicle speed VSP at S33, and stores the thus-determined initial upshift transmission ratio UP_ratio(0).

At step S34 after S33, controller 1 calculates the target transmission ratio Dratio by using the equation (4), calculates the target input shaft speed DsrRev by using the equation (2) at S35, and controls the actual transmission ratio of CVT 10 by outputting the control signal representing the thus-determined target transmission ratio Dratio at S16. At the time of transition from S33 to S34, the upshift quantity UP_ratio(n) is equal to 0, and hence the target transmission ratio Dratio is given by:

$$Dratio = DW\_ratio(\mathbf{0}) + DW\_ratio(g) - UP\_ratio(\mathbf{0}).$$

Step S12 is reached when step S6 judges that there is no mode transition. At S12, controller 1 selects a shift characteristic in accordance with the driver's acceleration demand (or intention) determined at S5, from the upshift map shown in FIG. 6.

By using the shift characteristic selected at S12, controller 1 determines the upshift quantity UP_ratio(n) corresponding to an increase in the vehicle speed VSP in accordance with the current vehicle speed at S13; and updates the upshift quantity UP_ratio(n) periodically in next and subsequent cycles.

After S13, controller 1 calculates the target transmission ratio Dratio by using the equation (1) at S14, calculates target input shaft speed DsrRev by using the equation (2) at S15, and outputs the control signal corresponding to the thus-determined target input shaft speed DsrRev at S16.

Step S4 is reached from S1 when the previous control mode is the linear mode, and examines whether the predetermined cancellation condition to cancel the linear mode is satisfied or not as in step S4 of FIG. 2. If the cancellation condition is satisfied, controller 1 cancels the linear mode, and performs the normal mode control at S20 instead.

In the normal mode, controller 1 determines the target input shaft speed DsrRev by using the shift map shown in FIG. 7, determines the target transmission ratio Dratio, and outputs the control signal representing the thus-determined transmission ratio Dratio at S16.

When the accelerator operation quantity APO continues to be equal to or greater than the predetermined level, controller 1 proceeds from S4 to S5 to continue the linear mode control.

When, in this shift control process of FIG. 14, a kickdown operation is detected by monitoring the accelerator operation speed dAPO, the control system selects the hill-climbing downshift mode (or hill-climbing linear mode) when the road gradient is uphill, and hence the vehicle running resistance is greater than a predetermined resistance level; and selects the normal downshift mode (or normal linear mode) when the road gradient is flat or downhill and hence the running resistance is smaller than or equal to the predetermined resistance level. By so doing, the control system accelerates the vehicle while restraining the downshift quantity.

The control system according to the second embodiment shown in FIGS. 13 and 14 controls the transmission ratio of CVT 10 in dependence on the road gradient θ in the following manner.

Kickdown Operation on a Level or Downhill Road

When, during a vehicle running operation in the normal mode on a level or downhill road, the accelerator pedal is depressed and the accelerator operation speed dAPO exceeds reference dAPOL shown in FIG. 3, then the control system changes over the shift control mode to the normal linear mode to start the normal kickdown acceleration control, and ascertains the driver's acceleration demand by using the map of FIG. 4.

In the first control cycle, mode flag Mf is zero (Mf=0), and hence the control system sets the downshift transmission ratio DW_ratio(0) at S8 and S9. As shown in FIG. 5, this downshift transmission ratio DW_ratio(0) is a function of the vehicle speed, and the downshift map of FIG. 5 is so set that the downshift quantity is increased as the acceleration demand is greater.

Figure 15:
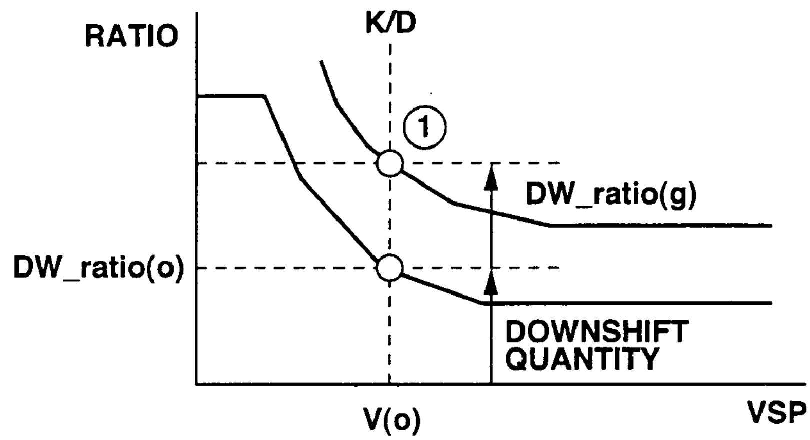
FIG. 15 is a view of the downshift map for illustrating an operation to determine the downshift transmission ratio DW_ratio(0) in the system of FIGS. 13 and 14.

The program section of S8 and S9 sets, as target transmission ratio Dratio, the downshift transmission ratio DW_ratio(0) at the time of occurrence of a kickdown operation, as shown in FIG. 15.

When the actual transmission ratio becomes equal to the downshift transmission ratio DW_ratio(0)=Dratio, the control system sets the initial upshift quantity UP_ratio(0) at the time of completion of the downshift operation, corresponding to the vehicle speed VSP at the time of the kickdown operation, as shown in FIG. 9, and initiates the upshift mode (S10 and S11). The actual transmission ratio at the time of completion of the downshift operation is equal to the target transmission ratio at the time of the kickdown operation (which is equal to the downshift transmission ratio DW_ratio(0)). Therefore, the initial upshift quantity UP_ratio(0) is set to a value corresponding to the target transmission ratio at the time of the kickdown operation.

This initial upshift quantity UP_ratio(0) is determined according to one of the shift characteristics shown in FIG. 6 so that the upshift quantity is decreased with increase in the acceleration demand. Thus, the control system starts the upshift operation to a smaller transmission ratio (to the Hi side) determined by the upshift quantity according to the equation (1). Then, the control system updates the upshift quantity UP_ratio(n) every control cycle in accordance with an increase in vehicle speed VSP until the cancellation condition of the linear mode is satisfied.

Figure 16:
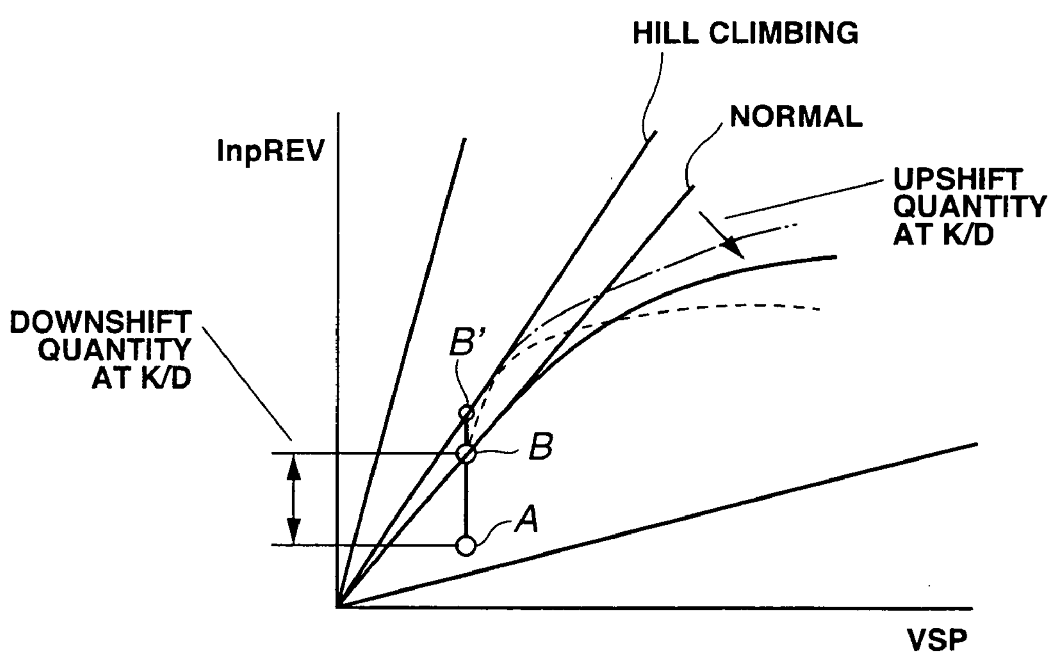
FIG. 16 is a view of a map of the input shaft speed inpRev dependent on vehicle speed VSP in a kickdown acceleration, with a solid line showing behavior of the input shaft speed inpRev in a normal linear mode of the control system shown in FIGS. 13 and 14, a one-dot chain line showing behavior of the input shaft speed inpRev in a hill climbing linear mode of the control system shown in FIGS. 13 and 14, and a broken line showing behavior in the case of a comparative example.

Therefore, as shown in FIG. 16 the control system according to the second embodiment restrains the downshift quantity in the downshift mode after a kickdown operation, as compared to the shift characteristic in the normal mode shown in FIG. 7, by using the map of FIG. 5. Therefore, the control system restrains a change in input shaft revolution speed inpRev to an amount between a point A and a point B shown in FIG. 16. Thus, in the early stage of the acceleration, the control system can improve both the magnitude of the vehicle acceleration and the response of the vehicle acceleration.

After the actual transmission ratio has become equal to the target downshift transmission ratio DW_ratio(0), the control system performs the upshift operation by using the initial upshift quantity UP_ratio(0) equivalent to the amount at the time of the kickdown operation and the upshift quantity UP_ratio(n) determined by an increase in vehicle speed VSP so that an upshift quantity UPratio becomes equal to a difference between UP_ratio(0) and UP_ratio(n), as expressed as equation (3).

Thus, the difference resulting from subtraction of the upshift quantity UPratio from the downshift transmission ratio DW_ratio(0) becomes the target transmission ratio, and the transmission ratio is varied gradually to the upshift side toward a smaller transmission ratio, with increase in vehicle speed VSP after point B in FIG. 16 as shown by a solid line. Therefore, the shift control system restrains an excessive increase of engine speed Ne, and an undesired decrease of the vehicle acceleration, and thereby provides adequate vehicle acceleration responsive to the driver's intention of acceleration.

As shown by a broken line curve in FIG. 16, the downshift quantity in the control system of the comparative example is greater than the downshift quantity at point B in the control system of the second embodiment. Thereafter, the upshift quantity to the upshift side becomes excess as compared to the control system according to the embodiment of the present invention.

Figure 17:
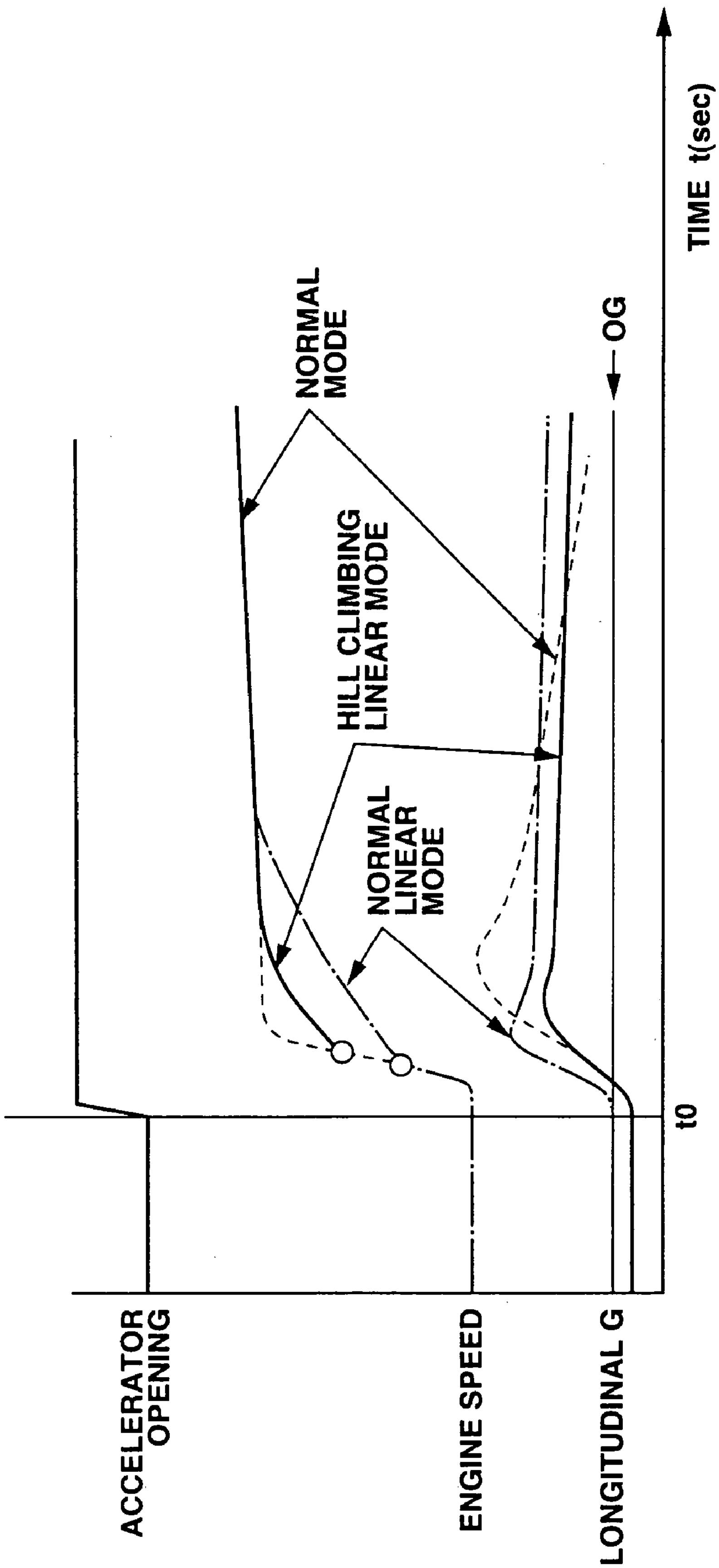
FIG. 17 is a graph illustrating time variation of accelerator operation quantity APO, engine speed and vehicle longitudinal acceleration (longitudinal G) in the kickdown acceleration, with solid lines for the hill climbing linear mode of the control system shown in FIGS. 13 and 14, one-dot chain lines showing the normal linear mode of the control system shown in FIGS. 13 and 14, and broken lines for the comparative example.

As a result, as shown in FIG. 17, the vehicle acceleration reaches a maximum sooner as shown by one-dot chain lines in the normal linear mode in the embodiment than in the comparative example. Moreover, the engine speed Ne at the time of the maximum acceleration is restrained at a lower engine speed level than a level of the comparative example, as in the first embodiment. Thus, the control system according to the second embodiment can adjust the magnitude of the vehicle acceleration and the time until the maximum acceleration so as to achieve optimum performance. In the upshift mode, the control system restrains the decrease in the transmission ratio as compared to the comparative example, so that the engine speed increases securely, and the vehicle acceleration does not decrease too much.

Kickdown Operation on an Uphill Road

When, during a vehicle running operation in the normal mode on an uphill road, the accelerator pedal is depressed and the accelerator operation speed dAPO exceeds reference dAPOL shown in FIG. 3, then the control system detects the hill-climbing condition at S27, and changes over the shift control mode to the hill-climbing linear mode to start the hill-climbing kickdown acceleration control.

In the first control cycle, mode flag Mf is zero (Mf=0), and hence the control system sets the downshift transmission ratio DW_ratio(0) at S29 and S30. As shown in FIG. 5, this downshift transmission ratio DW_ratio(0) is determined in the same manner as in the normal linear mode, in accordance with the vehicle speed, and the downshift quantity is increased as the acceleration demand is greater.

The program section of S29 and S30 sets, as target transmission ratio Dratio, the downshift transmission ratio DW_ratio(0) at the time of occurrence of the kickdown operation, as shown in FIG. 15.

Then, the control system calculates the hill-climbing correction transmission ratio DW_ratio(g) from the road gradient θ at S31, and determines target transmission ratio Dratio by addition of the hill-climbing correction transmission ratio DW_ratio(g) to the downshift transmission ratio DW_ratio(0), at S34.

Therefore, in the hill-climbing downshift mode, the target transmission ratio is increased to the greater side of the transmission ratio, by the amount of the hill-climbing correction transmission ratio DW_ratio(g), from the target transmission ratio in the normal downshift mode on a level or downhill road. The control system can accelerate the vehicle like acceleration on a level road, by increasing the engine speed in accordance with increase in the running resistance due to the road gradient θ.

When the actual transmission ratio becomes equal to the target transmission ratio Dratio, the control system sets the initial upshift quantity UP_ratio(0) at the time of completion of the downshift operation, corresponding to the vehicle speed VSP at the time of the kickdown operation, in the manner as shown in FIG. 9, and initiates the upshift mode (S32, S33). The actual transmission ratio at the time of completion of the downshift operation in the hill-climbing linear mode is equal to the target transmission ratio at the time of the kickdown operation which is equal to the downshift transmission ratio DW_ration(0) plus the hill-climbing correction transmission ratio DW_ratio(g). Therefore, the initial upshift quantity UP_ratio(0) in the hill-climbing linear mode (S33) is greater than the initial upshift quantity UP_ratio(0) in the normal linear mode (S11), by the hill-climbing correction transmission ratio DW_ratio(g) in the direction to increase the transmission ratio. Thereafter, the upshift operation is performed in the same manner as in the normal linear mode.

Therefore, as shown in FIG. 16, in the downshift mode after a kickdown operation in the hill-climbing condition, the target transmission ratio Dratio is varied to the Low side to increase the transmission ratio, as compared to the target transmission ratio in the normal downshift mode. Accordingly, the input shaft speed inpRev is increased from point A to point B', as shown in FIG. 16, to improve the magnitude and response of the vehicle acceleration in the early stage of the acceleration in the hill-climbing operation.

After the completion of the downshift operation, the transmission ratio is decreased gradually from point B' as shown by a one-dot chain line with increase in vehicle speed VSP. Accordingly, the shift control system can provide adequate vehicle acceleration suitable to the driver's intention of acceleration by restraining an excessive increase in engine speed Ne and an excessive decrease in the vehicle acceleration during the acceleration.

In the case of the comparative example, the downshift quantity is determined equally irrespective of whether the road is uphill or not. Therefore, the increase of the engine speed is sluggish as shown by a broken line in FIG. 16, as compared the one-dot chain line, and the vehicle cannot accelerate sufficiently against the running resistance due to the road gradient θ.

By contrast, the hill-climbing correction quantity DW_ratio(g) is varied in dependence on road gradient θ or the running resistance. Therefore, the shift control system according to the second embodiment enables a kickdown acceleration on an uphill road equally as in an operation on a level road irrespective of the running resistance, and thereby accomplishes the driver's accelerating intention sufficiently.

As a result, as shown in FIG. 17, the vehicle acceleration reaches a peak sooner as shown by solid lines in the hill-climbing linear mode, as in the normal linear mode shown by one-dot chain lines, than in the comparative example. Moreover, the engine speed Ne at the time of the maximum acceleration is increased in accordance with the road gradient θ, so that the feel of acceleration is obtained even in the uphill condition as in the level condition.

In the upshift mode, like the normal linear mode, the control system restrains the decrease in the transmission ratio in the hill-climbing linear mode, as compared to the comparative example, so that the engine speed increases securely, the vehicle acceleration does not decrease too much, and the driver can feel continuation of acceleration.

The road gradient sensing device 6 in the example shown in FIG. 18 employs a G sensor for sensing the vehicle longitudinal acceleration g. However, it is optional to determine the road gradient during running operation of the vehicle, from map data of a car navigation system and the current location of the vehicle.

In the illustrated example of the second embodiment, the road gradient is sensed to estimate the running resistance. However, it is optional to sense the load of the vehicle as a parameter indicating running resistance, and to modify the downshift quantity in accordance with the sensed load or total weight of the vehicle.

Figure 19:
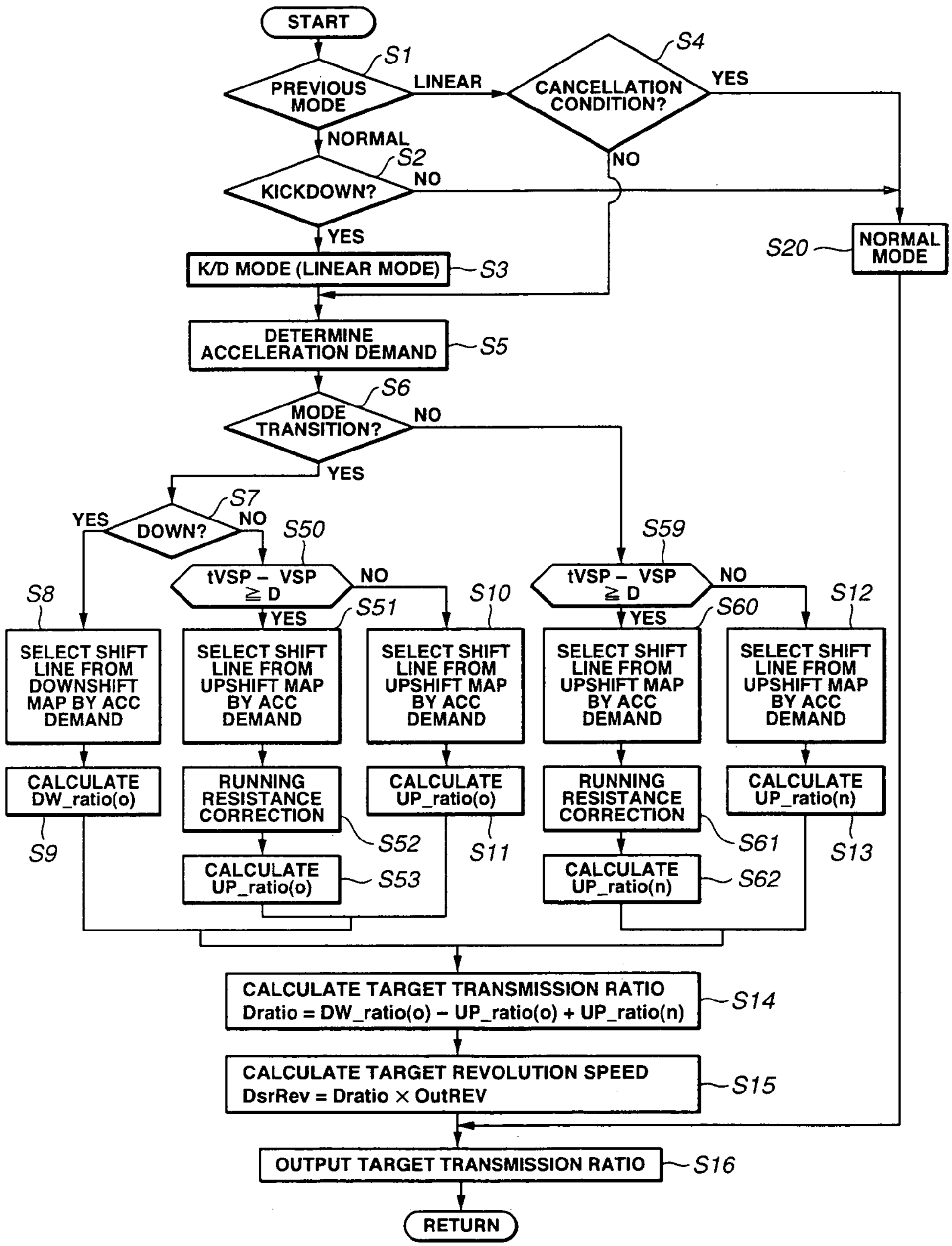
FIG. 19 is a flowchart showing a shift control process performed by a controller in a shift control system according to a third embodiment of the present invention.

FIG. 19 shows a shift control process performed periodically by a controller 1 of a CVT control system according to a third embodiment of the present invention. The control system according to the third embodiment includes all the components 10, 11, 12, 1, 2, 3, 4 and 5 arranged as shown in FIG. 1. Steps S1~S16 and S20 in FIG. 19 are substantially identical to the corresponding steps in FIG. 2. The flowchart of FIG. 14 additionally includes a program section of steps S50~S53 and a program section of steps S59~S62.

As in the control process of FIG. 2, controller 1 determines, at S1, whether the previous shift control mode used in the previous cycle is the normal mode or the linear mode, by checking control flag F. In the case of the normal mode, controller 1 examines, at S2, whether a kickdown (K/D) operation is performed or not, in the same manner as in the process of FIG. 2 using the map of FIG. 3.

When a kickdown operation is detected at S2, controller 1 sets control flag F to one (F=1) at S3, and then determines the driver's acceleration demand (or driver's acceleration intention) at S5, by using the map of FIG. 4 in the same manner as in the process of FIG. 2, in accordance with the accelerator operation condition (such as APO and dAPO).

Then, at S6, controller 1 checks mode flag Mf to determine whether the changeover from the downshift mode to the upshift mode within the linear mode is completed. When mode flag Mf is zero (Mf=0), then controller 1 proceeds from S6 to step S7. When Mf=1, controller 1 proceeds from S6 to step S59.

When mode flag Mf is in the zero state (Mf=0) indicating that the changeover from the downshift mode to upshift mode is not yet completed, controller 1 determines, at S7, whether the shift is to be the downshift mode and the upshift mode as in S7 of FIG. 2.

In this example, controller 1 selects the downshift mode and proceeds to step S8 when the downshift transmission ratio DW_ratio(0) is not set, or when the actual transmission ratio has not yet become equal to the downshift transmission ratio DW_ratio(0).

When the actual transmission ratio has reached the downshift transmission ratio DW_ratio(0), controller 1 selects the upshift mode, sets the mode flag Mf to one, and then proceeds to step S50.

At S8 for downshift mode, controller 1 selects a shift characteristic corresponding to the driver's acceleration demand (or intention) determined at S5, from the downshift map shown in FIG. 5.

By using the shift characteristic selected at S8, controller 1 determines the downshift transmission ratio DW_ratio(0) in accordance with the current vehicle speed VSP at S9, and stores the thus-determined downshift transmission ratio DW_ratio(0).

Then, at S14, controller 1 calculates the target transmission ratio Dratio according to the before-mentioned equation (1). At the time of progression from S9 to S14, the initial upshift quantity UP_ratio(0) and the upshift quantity UP_ratio(n) are both equal to zero. Therefore, target transmission ratio Dratio is equal to downshift transmission ratio DW_ratio(0).

At S15, controller 1 determines the target input shaft speed DsrRev by the equation (2). Then, at S16, the control system controls the actual transmission ratio of CVT 10 by outputting a control signal representing the thus-determined target transmission ratio Dratio.

When the answer of S7 is the upshift mode, controller 1 proceeds from S7 to step S50. At S50, controller 1 determines a look-ahead vehicle speed tVSP from a driving force and the vehicle speed VSP, and compares a difference between the actual vehicle speed VSP and the look-ahead vehicle speed tVSP, with a predetermined value D, to examine whether an increase of the actual vehicle speed VSP is weakened as compared to the accelerator operation quantity APO. In dependence on the result of this comparison, controller 1 selects one, as the shift control mode, from the normal upshift mode (normal linear mode) and an increased running resistance upshift mode (the linear mode used when the vehicle running resistance is high).

In order to determine the look-ahead vehicle speed tVSP, controller 1 first calculates an engine output torque of engine 11. The engine output torque can be calculated from the sensed engine speed Ne and a fuel injection pulse width (corresponding to a fuel injection quantity) calculated in the engine control section of controller 1. Alternatively, engine output torque can be estimated from the accelerator operation quantity APO and engine speed Ne when the control system is provided with data on characteristics of engine 11. From the thus-determined engine output torque, controller 1 determines the driving force by the following equation (5).

$$\text{Driving Force} = \text{Engine Output Torque} \times \text{Total Reduction Ratio} / \text{Tire Radius} \tag{5}$$

In this equation, the total reduction ratio is a reduction ratio resulting from the current actual transmission ratio and a reduction ratio of a differential gear. When a lockup clutch of torque converter 12 is in a released state, controller 1 modifies the engine output torque in accordance with a predetermined torque ratio.

Figure 20:
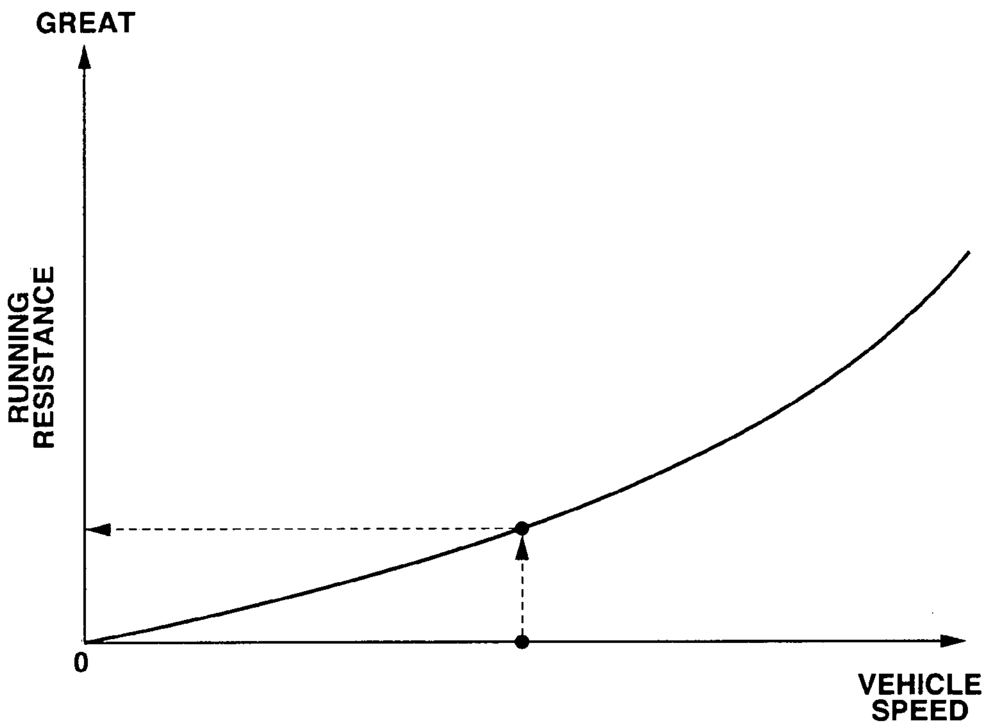
FIG. 20 is a map of a vehicle running resistance with respect to vehicle speed, used in the shift control process of FIG. 19.

Then, controller 1 calculates a driving force to keep the current vehicle speed on a level road by using a predetermined running resistance map (for level road) as shown in FIG. 20. Controller 1 further calculates a feasible acceleration attainable by the vehicle by diving the difference between the driving force to keep the current vehicle speed and the driving force determined by the equation (5), by the vehicle speed, and determines the feasible look-ahead vehicle speed tVSP, by integrating the acceleration and adding the result to the current vehicle speed.

Then, controller 1 checks the difference between the current vehicle speed and look-ahead vehicle speed by using the following expression (6).

$$\text{Look-ahead vehicle speed } tVSP - \text{Current vehicle speed } VSP > \text{Predetermined value } D \tag{6}$$

If the current vehicle speed VSP obtained by the current driving force is lower than the look-ahead vehicle speed tVSP, by an amount greater than predetermined value D, then controller 1 considers that the acceleration is weakened, and proceeds to step S51 for the increased resistance upshift mode. If, on the other hand, the difference between the look-ahead vehicle speed tVSP and the actual vehicle speed VSP is smaller than the predetermined value D, then the controller 1 considers that the acceleration is achieved in conformity with the driving force, and hence proceeds to step S10 to carry out the normal linear upshift mode.

For evaluation of the acceleration performance, it is possible to estimate the acceleration obtained by the driving force and to compare the estimated acceleration with the actual acceleration. However, the estimated acceleration is varied largely by the accelerator operation. Therefore, the control system according to the third embodiment is arranged to detect a slowdown of the acceleration reliably and accurately by the conversion to the look-ahead vehicle speed.

The predetermined value D in the expression (6) is determined by the vehicle model, and vehicle specification data items. The slowdown of the acceleration is undesirable especially when the vehicle speed is lower. Therefore, in this example, the predetermined value D is set equal to 5 Km/h when the vehicle sped is 20 Km/h, and the predetermined value D is 15 Km/h when the vehicle speed is higher than or equal to 80 Km/h. Between 20 Km/h and 80 Km/h, controller 1 determines the predetermined value D at each value of the vehicle speed by linear interpolation.

The vehicle weight used in this example includes the weight of the vehicle body and the weights of two persons. The actual vehicle weight varies more or less by change in the number of passengers or by other factors. However, the variation is, in general, within the range equal to or smaller than 10% of the total weight, and the amount of the variation is smaller than a variation of the running resistance due to hill-climbing road or by traction.

In the increased running resistance upshift mode at step S51, controller 1 selects a shift characteristic in accordance with the driver's acceleration demand (or intention) determined at S5, from the upshift map shown in FIG. 6.

Figure 21:
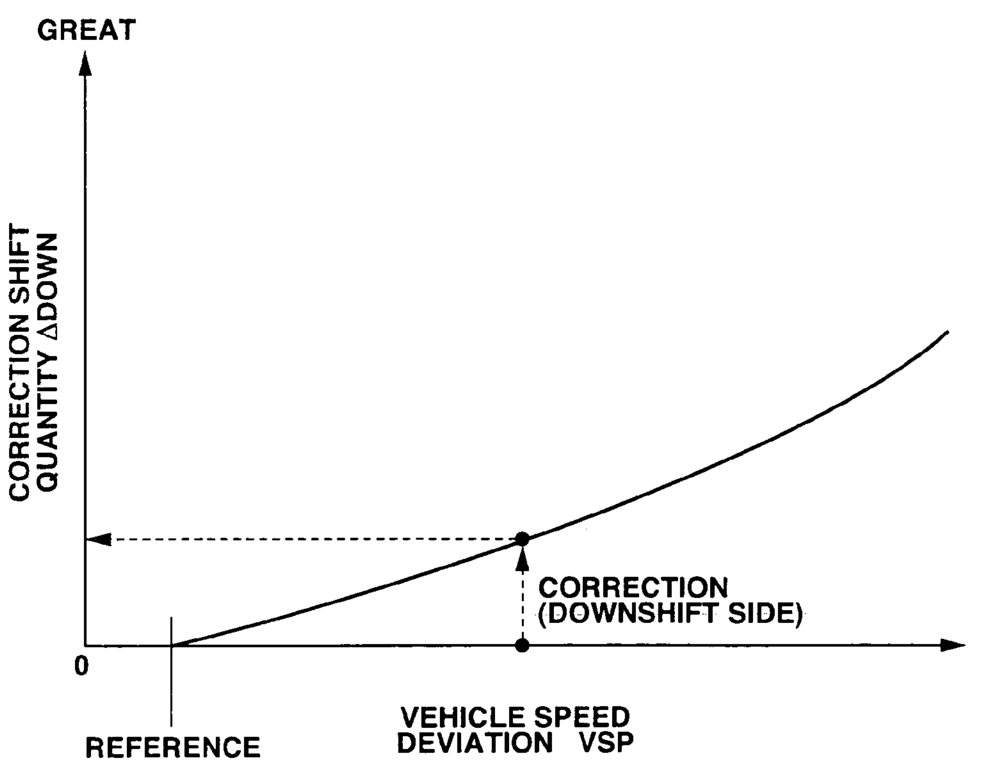
FIG. 21 is a view of a map for determining a downshift correction quantity from a vehicle speed deviation, used in the control process of FIG. 19.

At next step S52, controller 1 determines a correction shift quantity or transmission ratio correction quantity ΔDown from a vehicle speed deviation eVSP which is equal to the result obtained by subtracting the actual vehicle speed VSP from the look-ahead vehicle speed (eVSP=tVSP-VSP), by using a map shown in FIG. 21. This transmission ratio correction quantity ΔDown is a correction (down shift quantity) for an increase in the running resistance corresponding to vehicle speed deviation eVSP.

At step S53, by using the shift characteristic selected at S51, controller 1 determines the initial upshift quantity UP_ratio(0) in accordance with the vehicle speed VSP at S11, and modifies this initial upshift quantity determined by the upshift characteristic, with the transmission ratio correction quantity ΔDown by the following equation (7):

$$\text{UP\_ratio}(\mathbf{0})=\text{UP\_ratio}(\mathbf{0})-\Delta\text{Down} \quad (7)$$

Thus, the initial upshift quantity UP_ratio(0) is corrected to the downshift side by ΔDown.

After S53, controller 1 calculates the target transmission ratio Dratio by using the equation (1) at 514, calculates target input shaft speed DsrRev by using the equation (2) at 515, and controls the actual transmission ratio of CVT 10 by outputting the control signal representing the thus-determined target transmission ratio Dratio at S16.

In this increased resistance upshift mode, the control system restrains the upshift quantity as compared to the upshift quantity in the normal upshift mode, by correcting the initial upshift quantity UP_ratio(0) with the correction quantity ΔDown to the downshift side. Alternatively, when the increase of vehicle speed VSP by the downshift is very small (when the vehicle speed deviation eVSP is very great), the control system commands an increase of the driving force by the correction to the downshift side.

At the time of transition from S53 to S14, the upshift quantity UP_ratio(n) is equal to 0, and hence the target transmission ratio Dratio is given by:

$$D\text{ratio}=DW\text{\_ratio}(\mathbf{0})-\text{UP\_ratio}(\mathbf{0}).$$

When the answer of step S50 is NO, indicating the normal upshift mode, controller 1 proceeds to step S10, and selects a shift characteristic in accordance with the driver's acceleration demand (or intention) determined at S5, from the upshift map shown in FIG. 6.

By using the shift characteristic selected at S10, controller 1 determines the initial upshift quantity UP_ratio(0) in accordance with the vehicle speed VSP, and stores the thus-determined initial upshift quantity UP_ratio(0) at S11.

After S11, controller 1 proceeds to step S14, and calculates the target transmission ratio Dratio by using the equation (1). Then, controller 1 calculates target input shaft speed DsrRev at S15 by using the equation (2), and controls the actual transmission ratio of CVT 10 at S16 by outputting the control signal representing the thus-determined target transmission ratio Dratio. At the time of transition from S11 to S14, the upshift quantity UP_ratio(n) is still equal to 0, and hence the target transmission ratio Dratio is given by: Dratio=DW_ratio(0)−UP_ratio(0).

In the first control cycle in the upshift mode after the completion of the downshift, controller 1 selects one of the normal upshift mode and the increased running resistance upshift mode in accordance with the vehicle speed deviation eVSP between the look-ahead vehicle speed eVSP and the actual vehicle speed VSP at S50~S53, S10 and S11, and decreases the upshift quantity by the transmission ratio correction quantity ΔDown in the increased resistance upshift mode, as compared to the upshift quantity in the normal upshift mode.

Step S59 is reached when step S6 judges that there is no mode transition. At S59, controller 1 determines the look-ahead vehicle speed tVSP from the driving force, and selects one of the normal upshift mode and the increased running resistance upshift mode in accordance with the vehicle speed deviation eVSP between the look-ahead vehicle speed eVSP and the actual vehicle speed VSP in the same manner as in S50. If the vehicle speed deviation eVSP is greater than or equal to the predetermined value D, then controller 1 proceeds to step S60 for the increased resistance upshift mode. If, on the other hand, vehicle speed deviation eVSP is smaller than the predetermined value D, then the controller 1 proceeds to step S12 to carry out the normal linear upshift mode.

In the increased running resistance upshift mode at step S60, controller 1 selects a shift characteristic in accordance with the driver's acceleration demand determined at S5, from the upshift map shown in FIG. 6.

At next step S61, controller 1 determines a transmission ratio correction quantity ΔDown from vehicle speed deviation eVSP, by using the map shown in FIG. 21.

At step S62, by using the upshift characteristic selected at S60, controller 1 determines the upshift quantity UP_ratio (n) in accordance with the current vehicle speed VSP, and modifies this initial upshift quantity with the transmission ratio correction quantity ΔDown by the following equation (7):

$$\text{UP\_ratio}(n)=\text{UP\_ratio}(n)-\Delta\text{Down} \quad (8)$$

After S62, controller 1 calculates the target transmission ratio Dratio by using the equation (1) at S14, calculates target input shaft speed DsrRev by using the equation (2) at S15, and controls the actual transmission ratio of CVT 10 by outputting the control signal representing the thus-determined target transmission ratio Dratio at S16.

When the answer of step S59 is NO, indicating the normal upshift mode, controller 1 proceeds to step S12, and selects a shift characteristic in accordance with the driver's acceleration demand (or intention) determined at S5, from an upshift map shown in FIG. 6.

By using the shift characteristic selected at S12, controller 1 determines the initial upshift quantity UP_ratio(0) in accordance with the current vehicle speed VSP, and stores the thus-determined initial upshift quantity UP_ratio(0) at S13.

After S13, controller 1 proceeds to step S14, and calculates the target transmission ratio Dratio by using the equation (1). Then, controller 1 calculates target input shaft speed DsrRev at S15 by using the equation (2), and controls the actual transmission ratio of CVT 10 at S16 by outputting the control signal representing the thus-determined target transmission ratio Dratio.

Step S4 is reached from S1 when the previous control mode is the linear mode, and examines whether the predetermined cancellation condition to cancel the linear mode is satisfied or not as in step S4 of FIG. 2. If the cancellation condition is satisfied, controller 1 cancels the linear mode, and performs the normal mode control at S20 instead.

In the normal mode, controller 1 determines the target input shaft speed DsrRev from the current vehicle speed VSP and accelerator operation quantity APO by using the shift map shown in FIG. 7, determines the target transmission ratio Dratio by dividing target input shaft speed DsrRev by the output shaft speed OutRev, and outputs the thus-determined transmission ratio Dratio at S16.

When the accelerator operation quantity APO continues to be equal to or greater than the predetermined level, controller 1 considers that the driver has intention of continuing the acceleration, and proceeds from S4 to S5 to continue the linear mode control.

When, in this shift control process of FIG. 19, a kickdown operation is detected by monitoring the accelerator operation speed dAPO, the control system performs a downshift operation according to the downshift characteristic corresponding to the acceleration intention; and thereafter performs an upshift operation by selecting one of the increased running resistance upshift mode and the normal upshift mode in accordance with the vehicle speed deviation eVSP between the look-ahead vehicle speed tVSP attainable by the current driving force and the actual vehicle speed VSP. In the normal upshift mode, the upshift is performed gradually with increase in vehicle speed VSP. In the increased resistance upshift mode, the control system varies the transmission ratio correction quantity ΔDown in accordance with the vehicle speed deviation eVSP, restrains the upshift quantity with this correction quantity ΔDown, and thereby compensates for a decrease in the acceleration due to an increase in the running resistance.

The control system according to the third embodiment shown in FIG. 19 controls the transmission ratio of CVT 10 in dependence on the running resistance increase.

Kickdown Operation in a Normal State

When, during a vehicle running operation in the normal mode on a level or downhill road, the accelerator pedal is depressed and the accelerator operation speed dAPO exceeds reference dAPOL shown in FIG. 3, then the control system changes over the shift control mode to the normal linear mode to start the normal kickdown acceleration control, and ascertains the driver's acceleration demand (or intention) by using the map of FIG. 4.

In the first control cycle, mode flag Mf is zero (Mf=0), and hence the control system sets the downshift transmission ratio DW_ratio(0) at S8 and S9. As shown in FIG. 5, this downshift transmission ratio DW_ratio(0) is a function of the vehicle speed, and the downshift map of FIG. 5 is so set that the downshift quantity (the amount of shift in the direction to increase the transmission ratio) is increased as the acceleration demand is greater.

The program section of S8, S9 and S14 sets, as target transmission ratio Dratio, the downshift transmission ratio DW_ratio(0) at the time of occurrence of a kickdown operation, as shown in FIG. 8.

Figure 22:
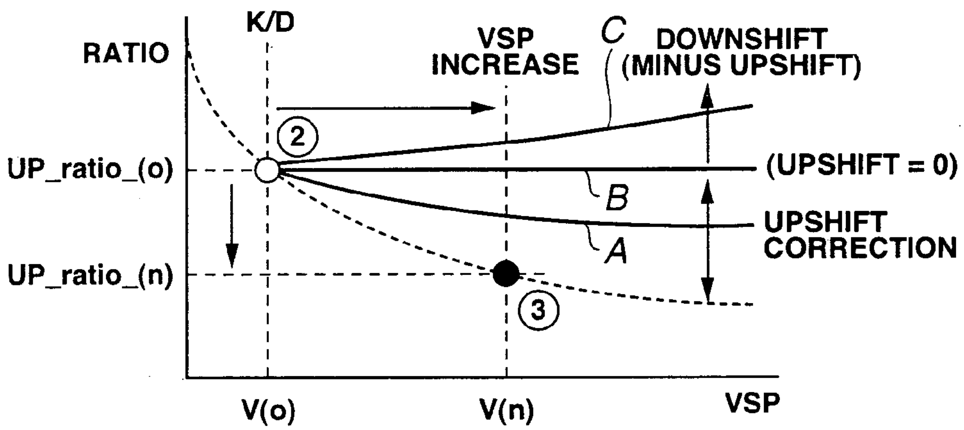
FIG. 22 is a view of the upshift map for illustrating an operation to determine the upshift quantity in the control process of FIG. 19.

When the actual transmission ratio becomes equal to the downshift transmission ratio DW_ratio(0)=Dratio; the control system compares the actual vehicle speed VSP and the look-ahead vehicle speed tVSP; selects the normal upshift mode if the vehicle speed deviation eVSP between VSP and tVSP is smaller than the predetermined value D; sets the initial upshift quantity UP_ratio(0) at the time of completion of the downshift operation, corresponding to the vehicle speed VSP at the time of the kickdown operation, as shown by a broken line in FIG. 22, and initiates the upshift mode (S10 and S11).

This initial upshift quantity UP_ratio(0) is determined according to one of the shift characteristics shown in FIG. 6 so that the upshift quantity is decreased with increase in the acceleration demand. Thus, the control system starts the upshift operation to a smaller transmission ratio (to the Hi side) determined by the upshift quantity according to the equation (1). Then, the control system updates the upshift quantity UP_ratio(n) every control cycle in accordance with an increase in vehicle speed VSP until the cancellation condition of the linear mode is satisfied.

Figure 23:
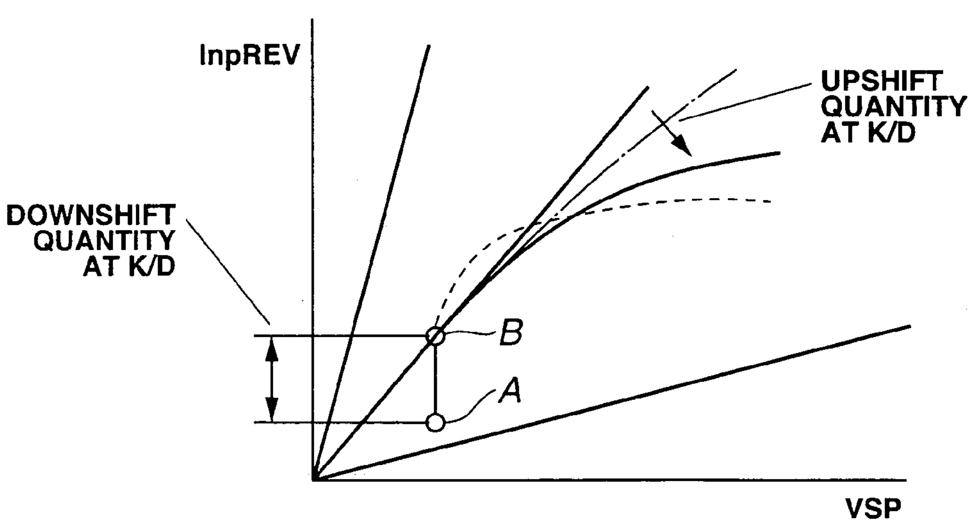
FIG. 23 is a view of a map of the input shaft speed inpRev dependent on vehicle speed VSP in a kickdown acceleration, with a solid line showing behavior of the input shaft speed inpRev in the normal linear mode of the control process shown in FIG. 19, a one-dot chain line showing behavior of the input shaft speed inpRev in an increased resistance linear mode of the control process shown in FIG. 19, and a broken line showing behavior in the case of a comparative example.

Therefore, as shown in FIG. 23, the control system according to the third embodiment restrains the downshift quantity in the downshift mode after the kickdown operation, as compared to the shift characteristic in the normal mode shown in FIG. 7, by using the map of FIG. 5. Therefore, the control system restrains a change in input shaft revolution speed impRev to an amount between a point A and a point B shown in FIG. 23. Thus, in the early stage of the acceleration, the control system can improve both the magnitude of the vehicle acceleration and the response of the vehicle acceleration.

After the actual transmission ratio has become equal to the target downshift transmission ratio DW_ratio(0), the control system performs the upshift operation by setting, as the target transmission ratio, the difference resulting from subtraction of the upshift quantity UPratio from the downshift transmission ratio DW_ratio(0), and varies the transmission ratio gradually to the upshift side toward a smaller transmission ratio, with increase in vehicle speed VSP after point B in FIG. 23 as shown by a solid line. Therefore, the shift control system restrains an excessive increase of engine speed Ne, and an undesired decrease of the vehicle acceleration, and thereby provides adequate vehicle acceleration responsive to the driver's intention of acceleration.

As shown by a broken line curve in FIG. 23, the downshift quantity in the control system of the comparative example is greater than the downshift quantity at point B in the control system of the third embodiment. Thereafter, the upshift quantity to the upshift side becomes excessive as compared to the control system according to this embodiment of the present invention.

Figure 24:
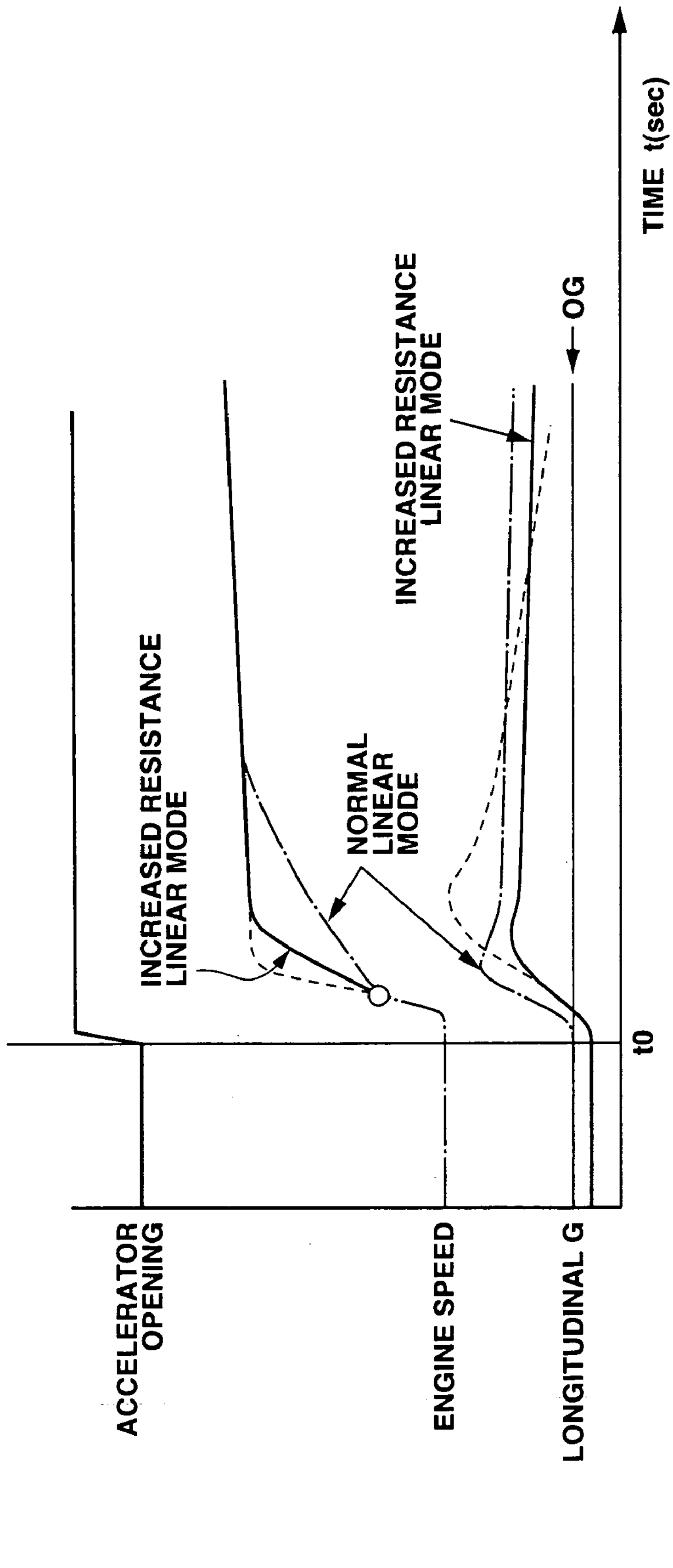
FIG. 24 is a graph illustrating time variation of accelerator operation quantity APO, engine speed and vehicle longitudinal acceleration (longitudinal G) in the kickdown acceleration, with solid lines for the increased resistance linear mode of the control process shown in FIG. 19, one-dot chain lines showing the normal linear mode of the control process shown in FIG. 19, and broken lines for the comparative example.

As a result, as shown in FIG. 24, the vehicle acceleration reaches a peak sooner as shown by one-dot chain or solid lines in the linear mode in the embodiment than in the comparative example shown by broken lines. Moreover, engine speed Ne at the time of the peak acceleration is restrained at a lower engine speed level than a level of the comparative example, as in the first embodiment. Thus, the control system according to the third embodiment can adjust the magnitude of the vehicle acceleration and the time until the maximum acceleration so as to achieve optimum performance. In the upshift mode, the control system restrains the decrease in the transmission ratio as compared to the comparative example, so that the engine speed increases securely, and the vehicle acceleration does not decrease too much.

In the case of a kickdown operation, the control system determines each of the shift characteristic on the downshift side and the shift characteristic on the upshift side in accordance with the driver's intention of acceleration. Therefore, it is possible to set the engine speed Ne flexibly to the kickdown acceleration request at each vehicle speed level. By the use of a plurality of shift characteristics corresponding to different levels of the driver's acceleration demand, the control system can secure optimum balance between rise and decrease of the vehicle acceleration with reduced load of the computation in controller 1, and achieve optimum kickdown acceleration in a wide speed range.

In the upshift operation after the downshift operation, the upshift quantity dependent on VSP is decreased with increase in the acceleration demand, as shown in FIG. 6. Therefore, the control system according to the third embodiment can increase the engine speed in accordance with the magnitude of the acceleration demand, and provide vehicle acceleration as expected by the driver.

Kickdown Operation in an Increased Running Resistance State

When, during a vehicle running operation in the normal mode in the state in which the vehicle running resistance is increased, for example, by traction of another vehicle, or by a hill-climbing road condition, the accelerator pedal is depressed and the accelerator operation speed dAPO exceeds reference dAPOL shown in FIG. 3, then the control system detects the kickdown operation, ascertains the driver's acceleration demand (or intention) by using the map of FIG. 4, and changes over the shift control mode to the linear mode.

In this case, the downshift transmission DW_ratio(0) is determined in the same manner as in the normal linear mode, according to the shift characteristic so set as to increase the downshift quantity (the shift quantity in the direction to increase the transmission ratio) as the acceleration intention becomes greater.

If vehicle speed deviation eVSP between actual vehicle speed VSP and look-ahead vehicle speed tVSP is greater than the predetermined value at the time of completion of the downshift operation, the control system selects the increased running resistance upshift mode, and determines the transmission ratio correction quantity ΔDown in accordance with vehicle speed deviation eVSP.

By using this transmission ratio correction quantity ΔDown, the control system corrects the upshift quantity to the downshift side (in the direction to increase the transmission ratio), as compared to the normal upshift mode. Therefore, the control system performs the upshift operation gradually as shown by a characteristic line A in FIG. 22 when vehicle speed deviation eVSP is relatively small. When vehicle speed deviation eVSP is great, as shown by a characteristic line B in FIG. 22, the upshift quantity is set equal to zero, and the acceleration of the vehicle is continued with downshift transmission ratio DW_ratio(0). When vehicle speed deviation eVSP is very great (because of a decrease of vehicle speed VSP, for example), the upshift quantity becomes negative (to the downshift side), and the control system accelerates the vehicle by performing a downshift beyond downshift transmission ratio DW_ratio(0) as shown by a characteristic line C in FIG. 22.

Thus, in the upshift mode after the downshift operation responsive to a kickdown operation with the downshift quantity corresponding to the driver's acceleration demand, the control system according to the third embodiment estimates the magnitude of the vehicle running resistance by an increase of vehicle speed VSP, and modifies the upshift quantity so as to reduce the vehicle speed deviation eVSP. Therefore, without regard to the magnitude of the running resistance, the control system can achieve the response and continuation of the acceleration, and provides the feeling of acceleration in conformity with the driver's accelerating intention.

As shown in FIG. 24, the peak of the vehicle acceleration (longitudinal G) in the increased resistance linear mode shown by a solid line becomes lower with increase in the running resistance, as compared to the normal linear mode shown by a one-dot chain line. However, the acceleration in the increased resistance linear mode shown by the slid line reaches its peak earlier than the characteristic of the comparative example shown by a broken line, so that the response at the start of the acceleration is improved like the normal linear mode. Thereafter, in the upshift operation, the control system of the third embodiment prevents a decrease of the acceleration caused by the comparative example shown by the broken line, even in the increased resistance linear mode like the normal linear mode, and thereby achieves an increase of vehicle speed VSP in conformity with the driver's acceleration intention.

Figure 25:
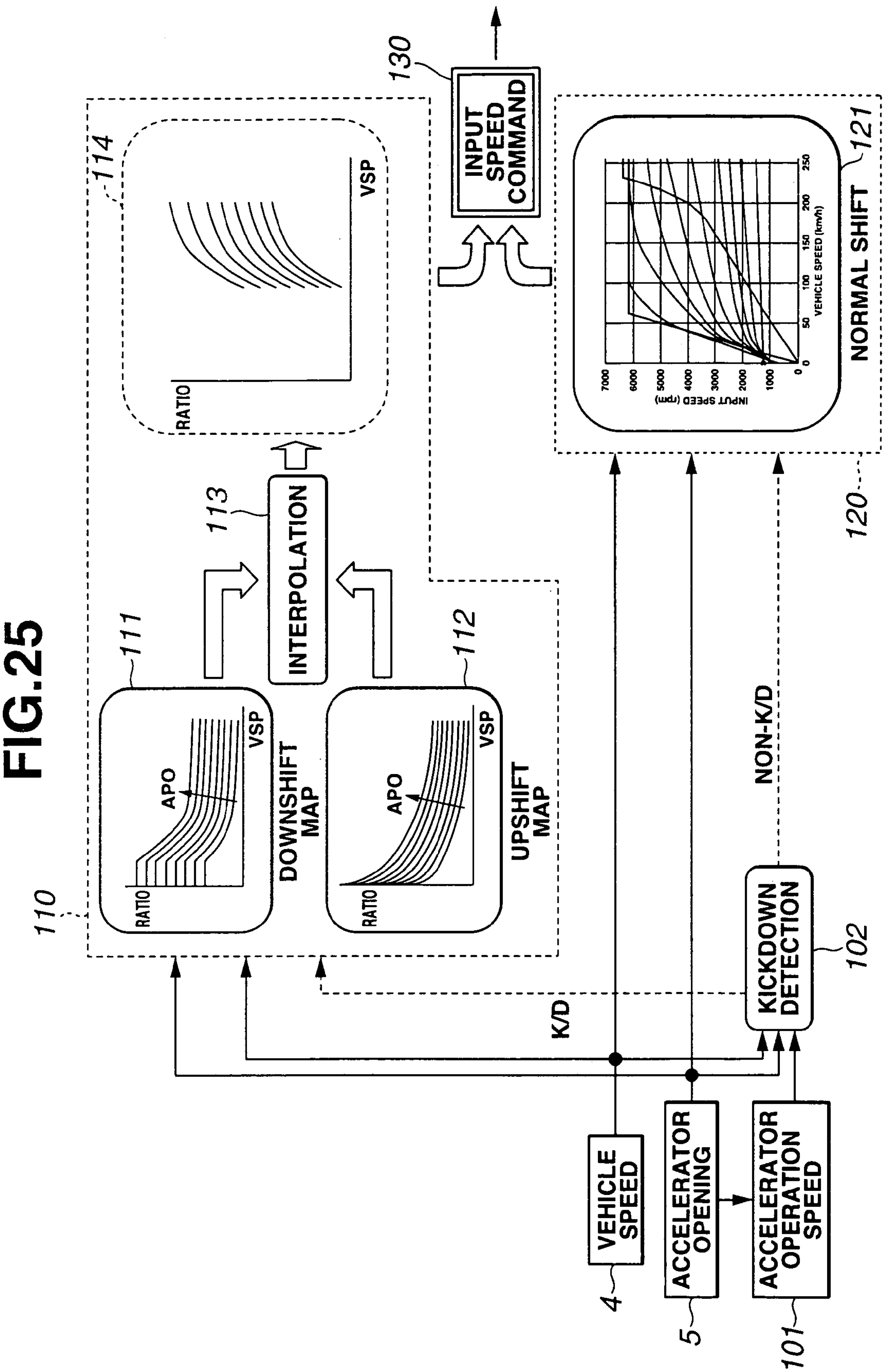
FIG. 25 is a block diagram showing a control system according to a fourth embodiment of the present invention.
Figure 26:
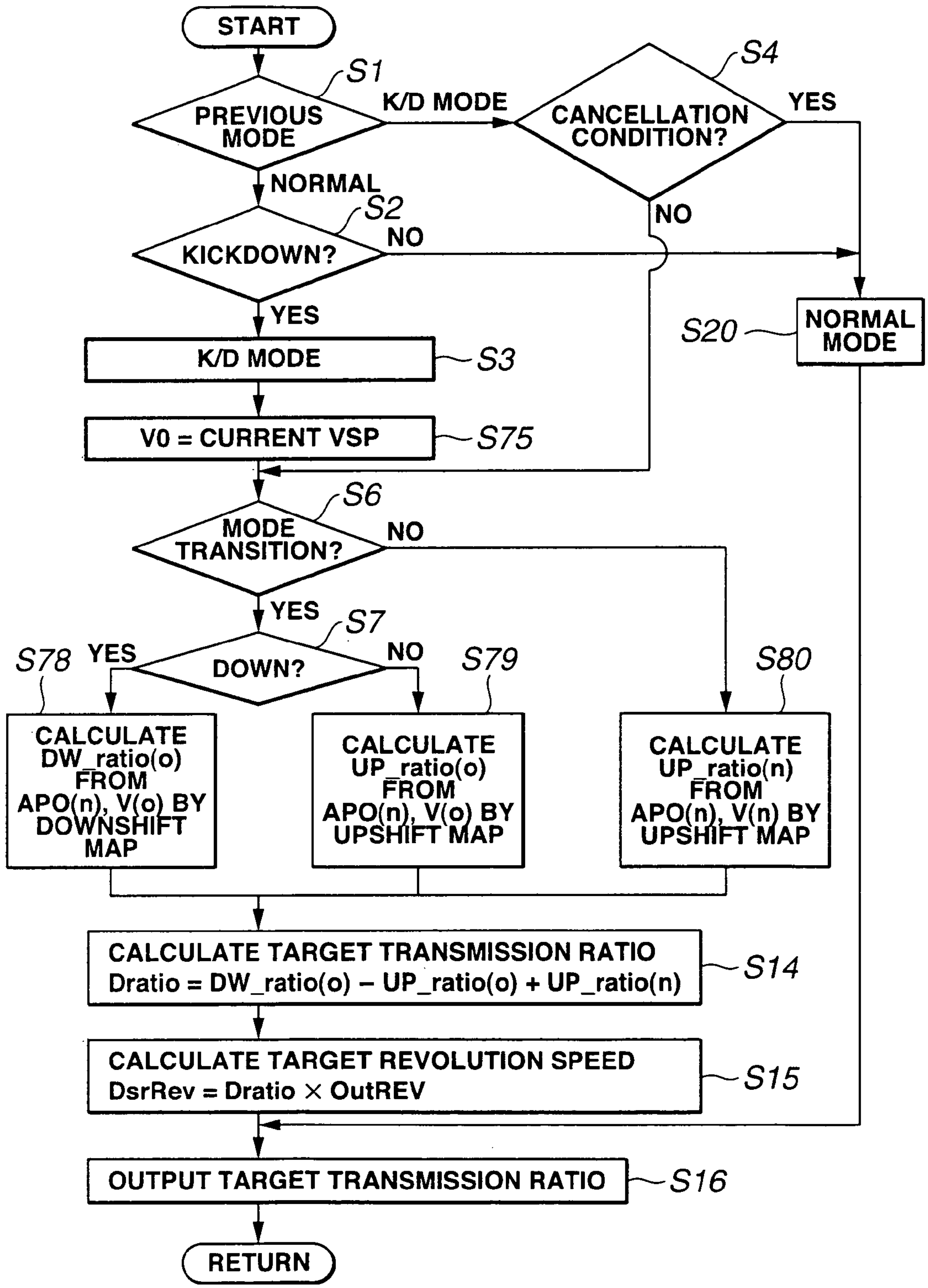
FIG. 26 is a flowchart showing a shift control process performed by the control system of FIG. 25.

FIGS. 25 and 26 show a CVT shift control system according to a fourth embodiment of the present invention. The control system according to the fourth embodiment includes all the components 10, 11, 12, 1, 2, 3, 4 and 5 arranged as shown in FIG. 1, as in the preceding embodiments.

FIG. 25 is a block diagram showing the configuration of main sections in a shift control section of controller 1 of the control system according to the fourth embodiment. The vehicle speed VSP from vehicle speed sensor 4 and the accelerator operation quantity APO from accelerator sensor 5 are inputted to each of a kickdown detecting section 102 for detecting a driver's intention of reacceleration, a mapless shift (kickdown shift section) 110 and a map shift section (or normal shift section) 120. An accelerator operation speed sensing section 101 determines the accelerator operation speed dAPO by differentiating accelerator operation quantity APO, and delivers the accelerator operation speed dAPO to kickdown detecting section 102.

Kickdown detecting section 102 is a means for selecting, as the shift control mode for the shift control of CVT 10, one of a mapless mode (or kickdown mode) of mapless shift section 110 and a map mode (or normal mode) of map shift section 120. When accelerator operation speed dAPO is higher than the reference speed dAPOL determined in accordance with vehicle speed VSP and accelerator operation quantity APO, the kickdown detecting section 102 determines that a kickdown operation is carried out by the driver, and selects the mapless mode of mapless shift section 110. Otherwise, kickdown detecting section 102 selects the (normal) map mode of map shift section 120 for the normal running condition.

Map shift section 120 determines the target input shaft speed (or target transmission ratio) in accordance with vehicle speed VSP and accelerator operation quantity APO by using a normal shift map 121, and delivers the thus-determined target input shaft speed to a command section

130. In response to the target input shaft speed, command section 130 drives an actuator of CVT 10 and thereby achieves a shift operation in CVT 10.

Mapless shift section 110 for the mapless (or kickdown) shift mode shown in FIG. 25 is mainly composed of a downshift quantity determining map 111, an upshift quantity determining map 112, and an interpolating section 113. Downshift quantity determining map 111 includes a plurality of downshift characteristics of the downshift quantity with respect to vehicle speed VSP so that each downshift characteristic corresponds to one of different values of accelerator operation quantity APO. Similarly, upshift quantity determining map 112 includes a plurality of upshift characteristics of the upshift quantity with respect to vehicle speed VSP so that each upshift characteristic corresponds to one of different values of accelerator operation quantity APO. Interpolating section 113 receives input data from each of maps 111 and 112, and calculates the downshift quantity and upshift quantity by interpolation.

In each of the downshift and upshift maps 111 and 112, each of shift characteristic corresponds to one of discrete value of accelerator operation quantity APO. When a value of the sensed operation quantity APO is intermediate between two discrete value of APO, the interpolating section 113 calculates an intermediate value of the downshift or upshift quantity from a value of VSP, by interpolation using the shift characteristics of the two discrete values of APO. In this way, interpolating section 113 determines a downshift quantity upon the occurrence of a kickdown operation from downshift map 11. After the completion of the downshift operation, interpolating section 113 determines an upshift quantity from the time point of the kickdown operation by using the upshift map 112. The target input shaft speed (or target transmission ratio) corresponding to the thus-determined downshift or upshift quantity is supplied from interpolating section 113 to command section 120. Thus, in the case of a kickdown operation, the transmission ratio is controlled as shown by a virtual shift line 114. The graph of virtual shift line 114 at kickdown shows variation of the output from interpolating section 113 with elapsed time.

FIG. 26 shows a CVT shift control process performed periodically by controller 1 of the CVT control system according to the fourth embodiment. Steps S1~S4, S6, S7, S14~S16 and S20 in FIG. 26 are substantially identical to the corresponding steps in FIG. 2. The flowchart of FIG. 26 does not includes S5, includes S75 instead, and further includes steps S78, S79 and S80 in place of steps S8~S13.

In the shift control process of FIG. 26, the shift control mode is switched between the map shift (normal) mode to vary the transmission ratio so as to trace the shift map 121 of map shift section 120, and the mapless (kickdown) shift mode to vary the transmission ratio under the control of mapless shift section 110 without tracing the map 121 of map shift section 120 when a predetermined accelerating condition or request (such as kickdown operation or other reaccelerating operation).

As in the control process of FIG. 2, controller 1 determines, at S1, whether the previous shift control mode used in the previous cycle is the map (normal) shift mode or the mapless (linear) shift mode, by checking control flag F. When the previous control cycle is performed in the map shift mode, then controller 1 proceeds to S2 to detect a kickdown operation. When, on the other hand, the previous control cycle is performed in the mapless shift mode, controller 1 proceeds to S4 to check whether the predetermined condition to cancel the mapless shift mode is met. In this example, control flag F is equal to one in the case of mapless shift mode, and zero in the case of map mode.

In the case of the previous mode being the map (normal) mode, controller 1 examines, at S2, whether a kickdown (K/D) operation is performed or not, in the same manner as in the process of FIG. 2 using the map of FIG. 3.

When a kickdown operation is detected at S2, controller 1 sets control flag F to one (F=1) at S3, and then proceeds to step S75. When no kickdown operation is detected, controller 1 proceeds from S2 to S20 to perform the shift control in the map (normal) shift mode.

At step S75 in the case of detection of the kickdown, the current vehicle speed VSP is set as a kickdown initial vehicle speed V0 at the time of a kickdown operation. Then, controller 1 proceeds from S75 to S6.

Then, at S6, controller 1 checks mode flag Mf to determine whether to perform the changeover from the downshift mode to the upshift mode within the mapless (linear) mode. When mode flag Mf is in the zero state (Mf=0) indicating that the changeover from the downshift mode to upshift mode is not yet completed, then controller 1 proceeds from S6 to step S7. When Mf=1, controller 1 proceeds from S6 to step S80.

When mode flag Mf is in the zero state (Mf=0) indicating that the changeover from the downshift mode to upshift mode is not yet completed, controller 1 determines whether the shift is to be the downshift mode or the upshift mode as in S7 of FIG. 2.

In this example, controller 1 selects the downshift mode and proceeds to step S78 when the downshift transmission ratio DW_ratio(0) is not set, or when the actual transmission ratio (=input shaft speed impRev/output shaft speed outRev) has not yet become equal to the downshift transmission ratio DW_ratio(0).

When the actual transmission ratio has reached the downshift transmission ratio DW_ratio(0), controller 1 selects the upshift mode, sets the mode flag Mf to one, and then proceeds to step S79.

Figure 27A:
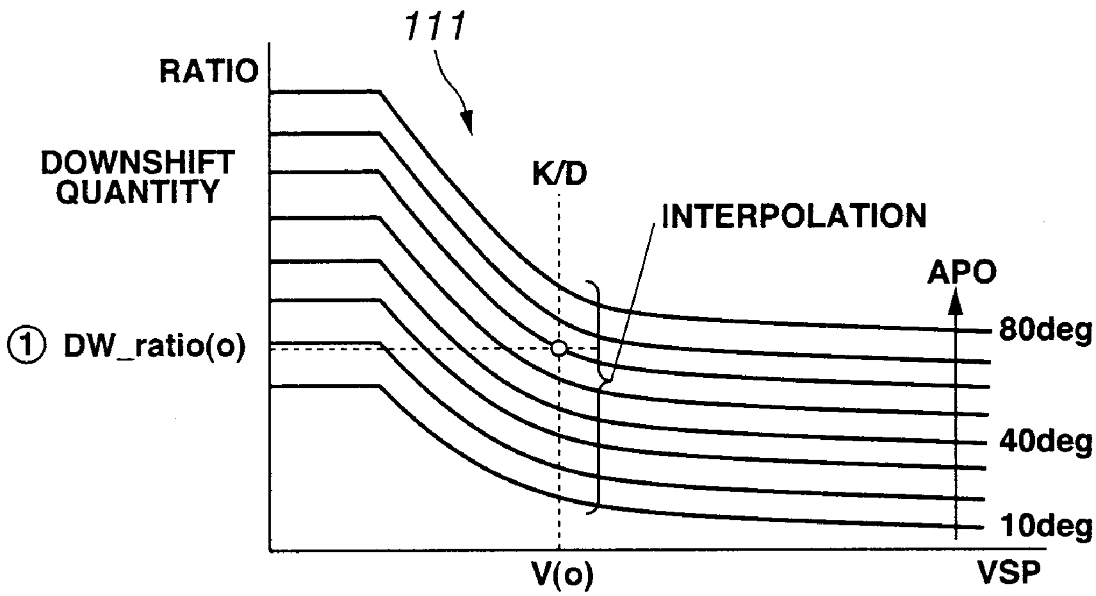
FIGS. 27A and 27B are views showing, respectively, a downshift quantity determining map 111 and an upshift quantity determining map 112, used by the control system shown in FIG. 25 when a kickdown acceleration is requested.

At S78 for the downshift mode, controller 1 calculates the downshift quantity from the kickdown point vehicle speed V0 and the current accelerator operation quantity APO by using the downshift quantity determining map 111 shown in FIG. 27A.

Downshift quantity determining map 111 shown in the example of FIG. 27A includes eight shift characteristics corresponding to eight discrete levels of accelerator operation quantity APO. In this example, the eight discrete levels of accelerator operation quantity (or accelerator opening degree) APO in terms of degrees are; 10° (1/8), 20° (2/8), 30° (3/8), 40° (4/8), 50° (5/8), 60° (6/8), 70° (7/8), and 80° (8/8 corresponding to the fully open position). The range of APO between 10° and 80° is divided into seven division having a width of 10°. The downshift quantity determined from APO and VSP represents the amount of shift from the Hi side transmission ratio.

If the current accelerator operation quantity APO is intermediate between the two adjacent discrete values among the eight discrete levels of APO, controller 1 determines the downshift transmission ratio DW_ratio(0) corresponding to the vehicle speed V0 and accelerator operation quantity APO by the operation of interpolation using the two adjacent shift characteristics, and stores the thus-determined down shift quantity in a predetermined memory location.

The number of shift characteristics in the downshift quantity determining map 111 is not limited to eight. The number of shift characteristic can be set to a desired number in accordance with the resolution of accelerator sensor 5 and the memory capacity of a storage device (such as ROM) in controller 1.

After S78, controller 1 proceeds to S14, and calculates the target transmission ratio Dratio according to the before-mentioned equation (1). In equation (1), UP_ratio(0) is an initial upshift quantity, and UP_ratio(n) is a subsequent transitive upshift quantity (the amount of shift in the direction to decrease the transmission ratio) corresponding to an increase in the vehicle speed. At the time of progression from S78 to S14, the initial upshift quantity UP_ratio(0) and the subsequent upshift quantity UP_ratio(n) are both equal to zero. Therefore, target transmission ratio Dratio is equal to downshift transmission ratio DW_ratio(0).

At S15, controller 1 determines the target input shaft speed DsrRev by the equation (2). Then, at S16, the control system controls the actual transmission ratio of CVT 10 by outputting the target input shaft speed DsrREV.

Step S79 is reached when the upshift mode is selected at S7. At S79 for the upshift mode, controller 1 calculates the initial upshift quantity UP_ratio(0) from the kickdown point vehicle speed V0 and the current accelerator operation quantity APO by using the upshift quantity determining map 112 shown in FIG. 27B, and stores the thus-determined initial upshift quantity UP_ratio(0).

Figure 27B:
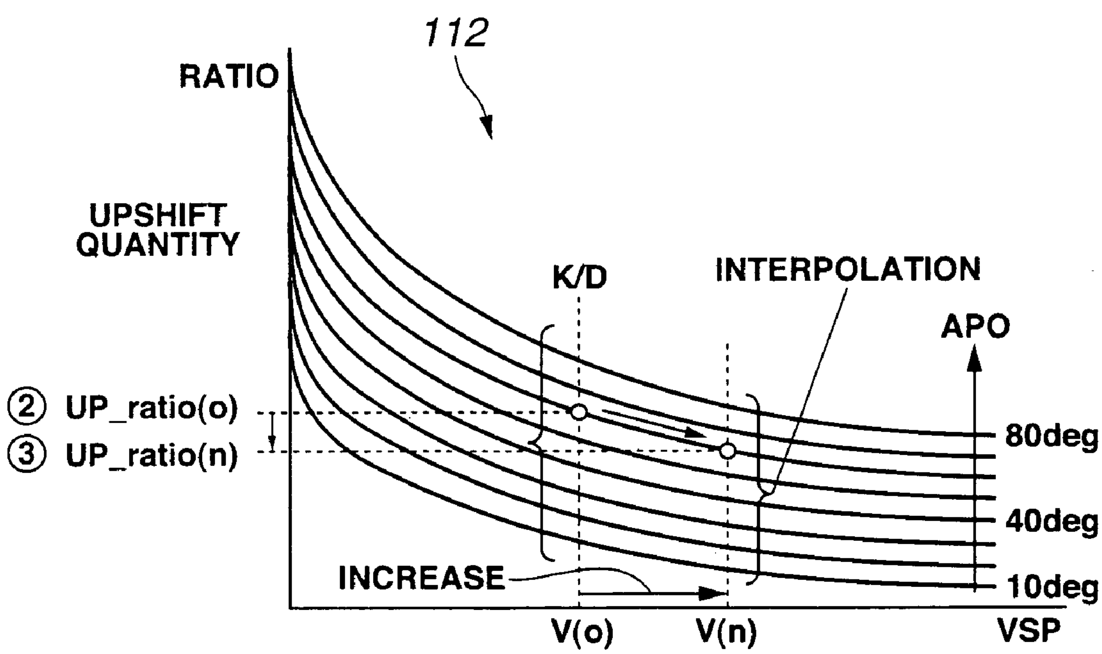

Upshift quantity determining map 112 shown in the example of FIG. 27B includes eight shift characteristics corresponding to eight discrete levels of accelerator operation quantity APO, like downshift quantity determining map 111 of FIG. 27A. In this example, the eight discrete levels of accelerator operation quantity (or accelerator opening degree) APO in terms of degrees are; 10° (1/8), 20° (2/8), 30° (3/8), 40° (4/8), 50° (5/8), 60° (6/8), 70° (7/8), and 80° (8/8). The upshift quantity represents the amount of variation of the transmission ratio (or the amount of variation of the target input shaft speed DsrRev) to the upshift side, from the downshift transmission ratio DW_ratio(0).

If the current accelerator operation quantity APO is intermediate between the two adjacent discrete values among the eight discrete levels of APO, controller 1 determines the initial upshift transmission ratio UP_ratio(0) corresponding to vehicle speed V0 and accelerator operation quantity APO by the operation of interpolation using the two adjacent upshift characteristics, and stores the thus-determined initial upshift quantity in a predetermined memory location.

The number of shift characteristics in the upshift quantity determining map 112 is not limited to eight. The number of shift characteristic can be set to a desired number in accordance with the resolution of accelerator sensor 5 and the memory capacity of the storage device (such as ROM) in controller 1.

After S79, controller 1 proceeds to S14, and calculates the target transmission ratio Dratio according to the before-mentioned equation (1). At the time of progression from S79 to S14, the subsequent transitive upshift quantity UP_ratio (n) is equal to zero. Therefore, target transmission ratio Dratio is equal to DW_ratio(0) minus UP_ratio(0).

Step S80 is reached when step S6 judges that there is no mode transition. At S80, controller 1 calculates the subsequent upshift quantity UP_ratio(n) from the current vehicle speed VSP and the current accelerator operation quantity APO by using the upshift quantity determining map 112 shown in FIG. 27B.

If the current accelerator operation quantity APO is intermediate between the two adjacent discrete values among the eight discrete levels of APO, controller 1 determines the subsequent upshift transmission ratio UP_ratio(n) by the operation of interpolation in the same manner as in the interpolation of the initial upshift quantity UP_ratio(0).

In the next and subsequent cycles, controller 1 updates the subsequent upshift quantity UP_ratio(n). After S80, controller 1 proceeds to S14, and calculates the target transmission ratio Dratio according to the before-mentioned equation (1). At S15, controller 1 determines the target input shaft speed DsrRev by the equation (2). Then, at S16, the control system controls the actual transmission ratio of CVT 10 by outputting the target input shaft speed DsrRev.

Step S4 is reached from S1 when the previous control mode is the mapless (linear) mode, and examines whether the predetermined cancellation condition to cancel the mapless mode is satisfied or not as in step S4 of FIG. 2. If the cancellation condition is satisfied, controller 1 cancels the mapless (linear) mode, and performs the map (normal) mode control at S20 instead. When the mapless mode is cancelled, controller 1 clears (resets to zero) F, Mf, DW_ratio(0), UP_ration(0) and UP_ratio(n) as in the preceding embodiments.

In the map (normal) mode, controller 1 determines the target input shaft speed DsrRev from the current vehicle speed VSP and accelerator operation quantity APO at S20 by using the shift map 121 shown in FIG. 25, and outputs the thus-determined target input shaft speed DsrRev at S16.

When the accelerator operation quantity APO continues to be equal to or greater than the predetermined level, controller 1 considers that the driver has intention of continuing the acceleration, and proceeds from S4 to S6 to continue the mapless shift mode.

In the map shift mode for the normal driving situation, the control system according to the fourth embodiment controls the actual transmission ratio of CVT 10 by using target input shaft revolution speed DsrRev corresponding to vehicle speed VSP and accelerator operation quantity APO according to the shift map 121 shown in FIG. 25. When the driver depresses the accelerator pedal with the intention of a kickdown acceleration, with the acceleration operation speed dAPO beyond the reference speed dAPOL, the control system achieves the kickdown acceleration by calculating the target representing the target transmission ratio or the target transmission input speed from the current vehicle operating condition according to the downshift quantity determining map 111 and upshift quantity determining map 112.

When, during a vehicle running operation in the normal map shift mode, the accelerator pedal is depressed and the accelerator operation speed dAPO exceeds reference dAPOL shown in FIG. 3, then the control system according to the fourth embodiment changes over the shift control mode to the mapless mode. In the first control cycle, mode flag Mf is zero (Mf=0). Therefore, the control system sets the downshift transmission ratio DW_ratio(0) at S78.

As shown in FIG. 27A, this downshift transmission ratio DW_ratio(0) is a function of the vehicle speed, and the downshift map of FIG. 27A includes a plurality of different (parallel) characteristics (which are eight in number in the example of FIG. 27A) of downshift transmission ratio DW_ratio(0) corresponding to different discrete levels of the accelerator operation quantity APO. In the fourth embodiment, the accelerator operation quantity APO is used as the driver's acceleration demand. The downshift quantity in FIG. 27A represents a downshift quantity from a most Hi side transmission ratio on a Hi side limit line in the normal shift map 121 (as shown in FIG. 7) in shift line (or from a most Hi side input shaft speed DsrRev on the Hi side limit line).

Figure 28A:
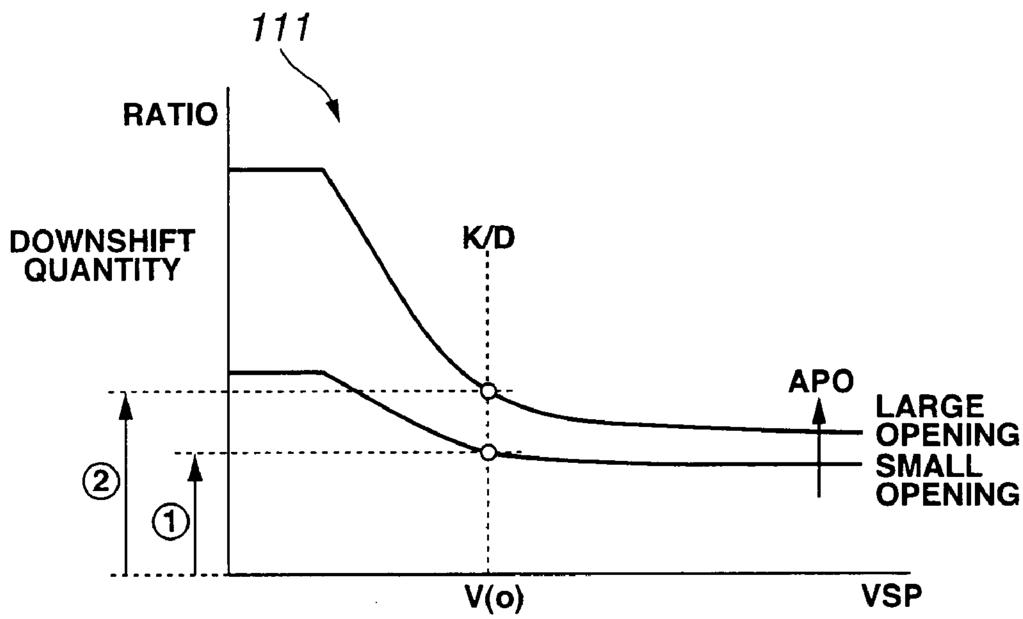
FIGS. 28A and 28B are simplified views of the downshift quantity determining map and upshift quantity determining map for illustrating the determination of downshift quantity and upshift quantity when the accelerator operation quantity APO is at a large opening level and a small opening level.

As shown in FIG. 28A, the downshift quantity determining map 111 is designed to decrease the downshift quantity as accelerator operation quantity APO becomes smaller (to a small accelerator opening), to increase the downshift quantity as accelerator operation quantity APO becomes greater (to a large opening), and to decrease the downshift quantity as vehicle speed VSP increases, to prevent excessive increase in engine noises in the kickdown acceleration at high vehicle speed. FIG. 28A shows only two shift characteristics among the eight lines for simplification, one corresponding to the maximum accelerator operation quantity (APO=8/8=80°), and the other corresponding to the minimum accelerator operation quantity (APO=1/8=10°).

The downshift quantity determining map 111 is designed to restrain or decrease the downshift quantity as compared to the normal shift map 121 so that the amount of variation of the target input shaft speed DsrRev determined by the downshift quantity determining map 111 is decreased (to the Hi side) as compared to the amount of variation of the target input shaft speed DsrRev determined by normal map 121, for the same condition.

When, for example, accelerator operation quantity APO is large (a large opening, APO=8/8), and the vehicle speed is V(0), the downshift quantity is given by an arrow ② shown in FIG. 28A. (The downshift quantity is the the amount of change of the transmission ratio from the Hi side transmission ratio.) In the normal shift map 121 shown in FIG. 29, a point B corresponds to the downshift transmission ratio DW_ratio(0) when the downshift quantity ② is converted to the input shaft speed DsrRev corresponding to V(0).

In the case of the normal shift map 121, by contrast, a point D is determined by tracing the shift line of APO=8/8 when accelerator operation quantity APO is 8/8, and vehicle speed VSP is V(0). Thus, as compared to the normal shift map 121, the downshift quantity ② determined by downshift quantity determining map 111 is set to a restrained value restrained or modified to the Hi side in the direction to decrease the transmission ratio and to increase the speed ratio.

The upshift quantity for the upshift operation after the downshift operation to the downshift transmission ratio DW_ratio(0) is determined by upshift quantity determining map 112 shown in FIG. 27B. Upshift quantity determining map 112 includes a plurality of different characteristics (which are eight in number in the example of FIG. 27B) corresponding to different discrete levels of the accelerator operation quantity APO. Each characteristic is a relationship of the transmission ratio with respect to vehicle speed VSP, for each level of accelerator operation quantity APO.

Figure 28B:
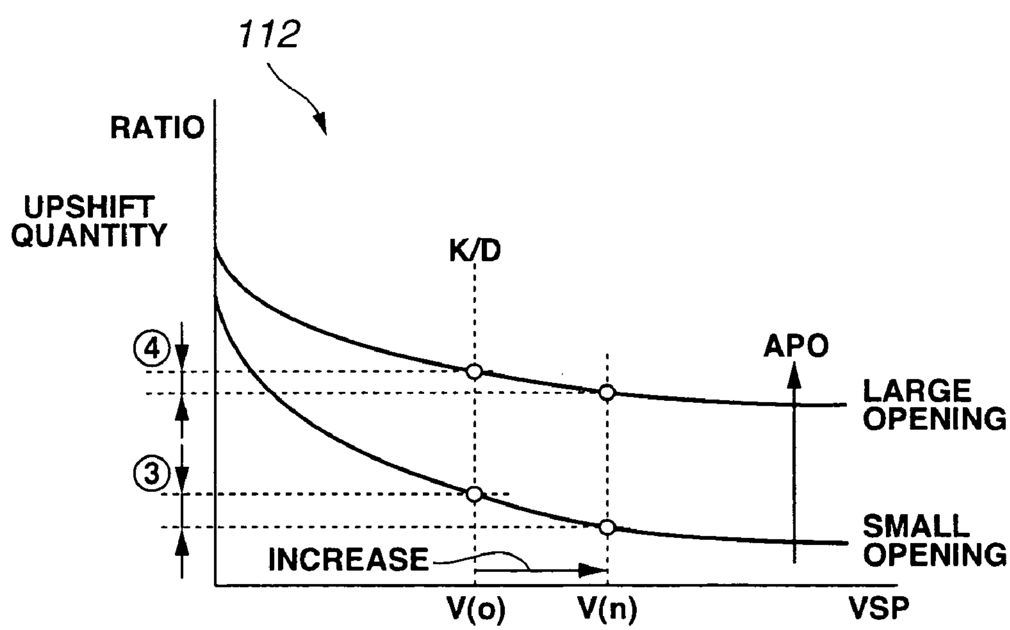

As shown in FIG. 28B, the upshift quantity determining map 112 is designed to increase the upshift quantity with respect to an increase of vehicle speed VSP (or the rate of decrease of the transmission ratio with respect to increase of the vehicle speed) when accelerator operation quantity APO is small (small opening). Therefore, the control system can restrain an increase of the engine speed and achieve a quiet kickdown acceleration with reduced noises.

When accelerator operation quantity APO is large (large opening in FIG. 28B), the upshift quantity with respect to an increase of vehicle speed VSP (or the rate of decrease of the transmission ratio with respect to increase of the vehicle speed) is set to a smaller level. Therefore, the control system increases the engine speed and vehicle speed both, and thereby continues to provide the feel of acceleration in conformity with the driver's accelerating intention.

Moreover, the upshift quantity determining map 112 is designed to increase the upshift quantity with respect to an increase of vehicle speed VSP (or the rate of decrease of the transmission ratio with respect to increase of the vehicle speed) as the vehicle speed VSP becomes lower. Thus, the control system increases the vehicle acceleration rapidly without causing engine racing.

The shift control system according to the fourth embodiment control CVT10 in the case of kickdown acceleration in the following manner, as shown in FIGS. 27A~29.

Figure 29:
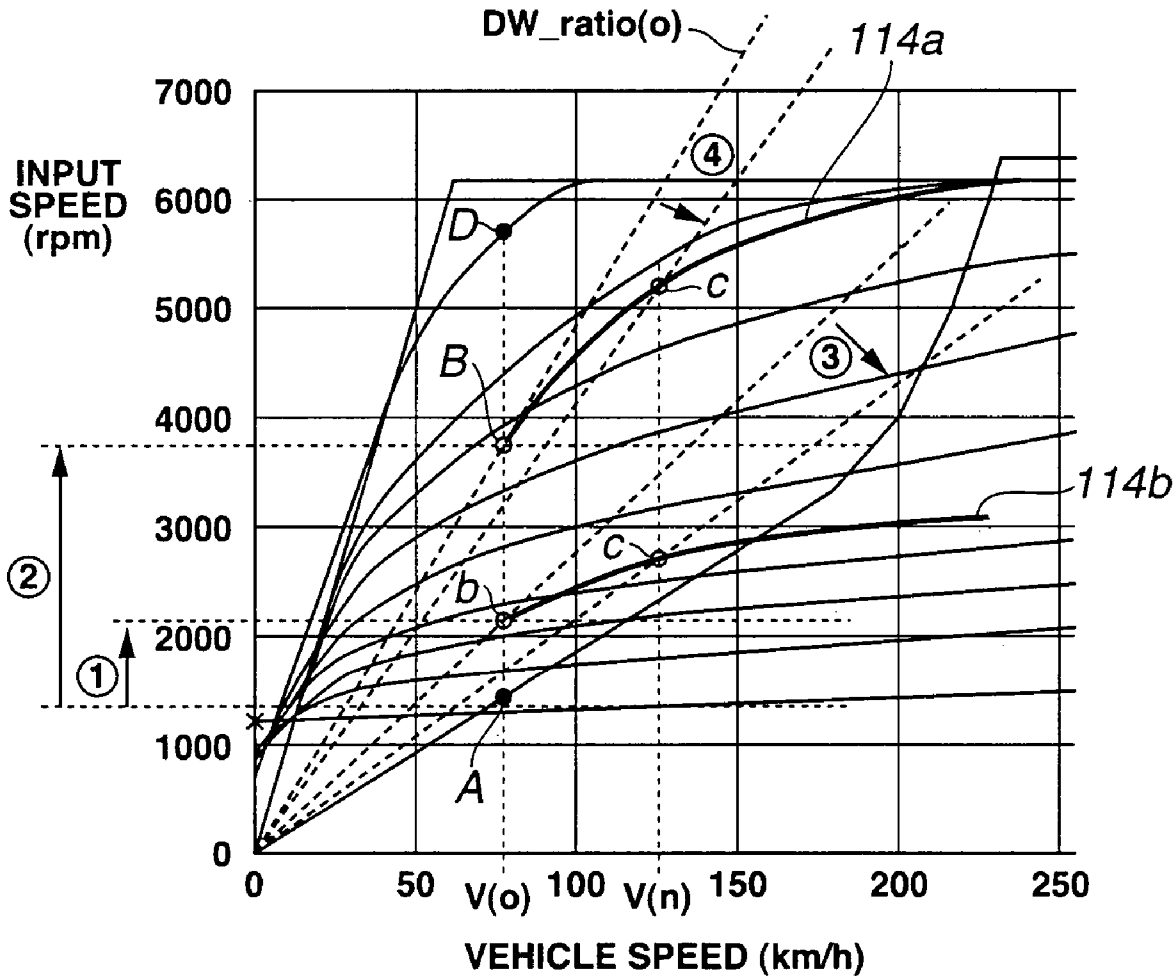
FIG. 29 is a graph of a normal map-shift mode map for illustrating a shift operation in a mapless shift mode in the control system of FIG. 25.

When, during a vehicle running operation in the normal map shift mode at the operating point A shown in the shift map of FIG. 29, the driver performs a kickdown operation by further depressing the accelerator pedal to a large opening degree (of APO=8/8), then the control system changes over the shift control mode to the mapless shift mode, sets the downshift quantity equal to an amount ② shown in FIG. 28A, and starts the downshift operation to the target input shaft speed DsrRev (or target transmission ratio Dratio) which is set at the operating point B shown in FIG. 29 by addition of the amount ② to the value at the point A (of the most Hi side transmission ratio on the Hi side limit line).

When the actual transmission ratio reaches point B, the control system sets the initial upshift quantity UP_ratio(0) at the accelerator operation quantity of APO=8/8 by using the vehicle speed V0 at the time point of the kickdown operation, and starts the upshift operation.

In the upshift mode, the control system updates the subsequent upshift quantity UP_ratio(n) in each control cycle in accordance with an increase in the current vehicle speed VSP, and thereby determines the upshift quantity from the difference between the initial upshift quantity UP_ratio (0) and the subsequent upshift quantity UP_ratio(n) at the vehicle speed of V(n), as shown by an amount ④ (in FIG. 28B.

$$\text{Upshift Quantity} = \text{UP\_ratio}(\mathbf{0}) - \text{UP\_ratio}(n)$$

By this upshift quantity ④, the control system sets a new target input shaft speed DserRev at a point C shown in FIG. 29, and performs the upshift operation. As shown in FIG. 29, this point C is an intersection point between a sloping broken line (determining a target transmission ratio Dratio) which is shifted (or rotated in the clockwise direction about the origin in FIG. 29) to the Hi side to increase the speed ratio, from a sloping broken line of the downshift transmission ratio DW_ratio(0) passing through point B, by the amount ④; and a vertical broken line at vehicle speed value V(n).

Figure 30:
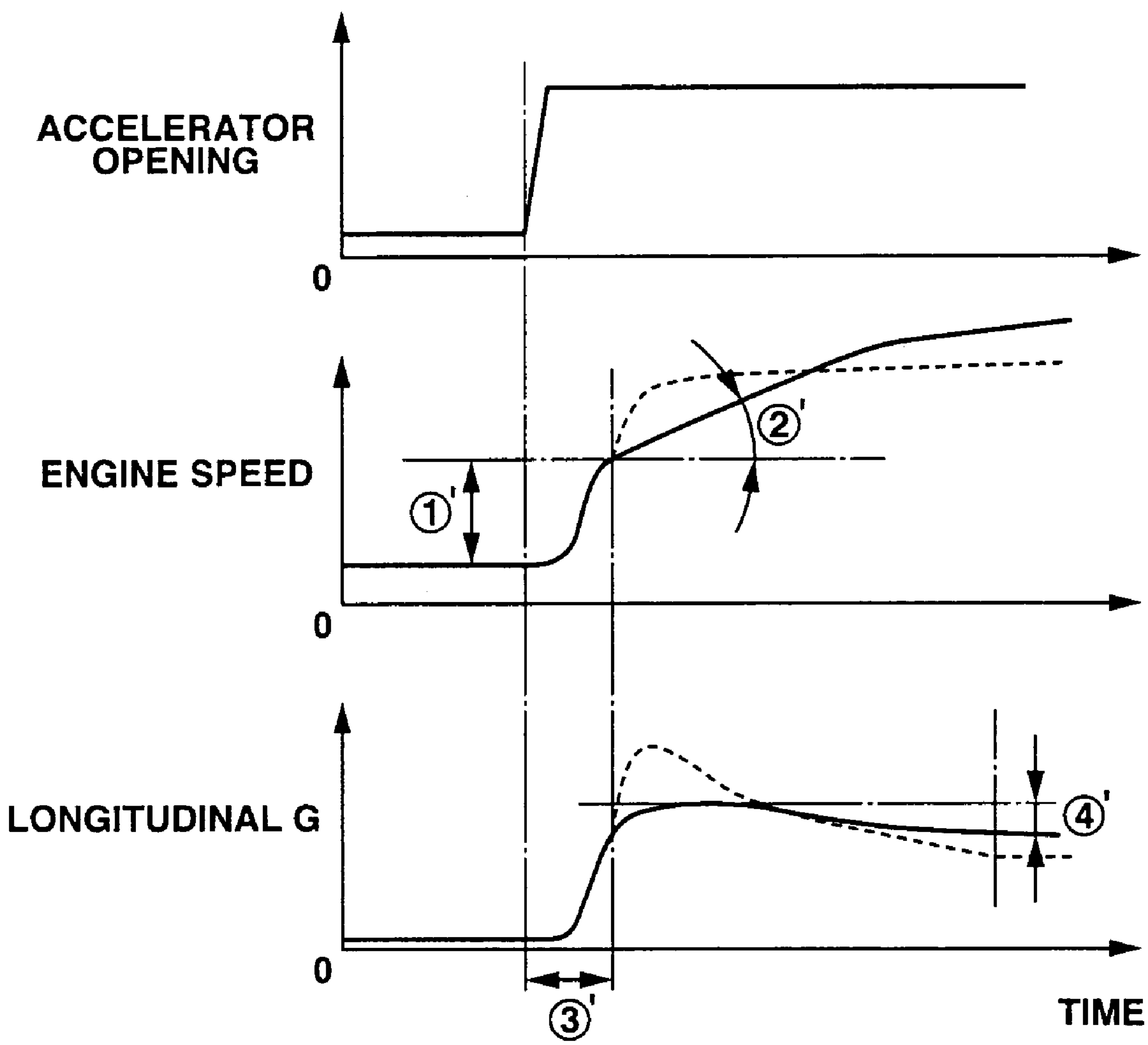
FIG. 30 is a graph showing time variation of the accelerator opening quantity, engine speed and vehicle acceleration in the control system of FIG. 25.

Thereafter, with increase in vehicle speed VSP, the control system calculates a new value of the subsequent upshift quantity UP_ratio(n) from the map of FIG. 28B, and thereby varies the target input shaft speed in the mapless shift mode along a virtual shift line 114*a* shown in FIG. 29. Thus, after the downshift operation, the transmission ratio of CVT 10 is shifted gradually to the Hi side in the direction to increase the speed ratio. When the engine speed reaches a predetermined upper limit, and accelerator operation quantity APO is large, the downshift quantity is restrained and the upshift operation is limited so as to decrease the upshift quantity. Therefore, as shown in FIG. 30, the control system can prevent excessive increase in the engine speed (as shown by ①'), and increase the vehicle acceleration rapidly (as shown by ③'). Thereafter, the control system can continue to increase engine speed (as shown by ②') with a relatively small upshift quantity corresponding to an increase in vehicle speed VSP without constraint of the shift lines in the normal shift map 121. Therefore, the control system can prevents an undesired decrease in the vehicle acceleration after the peak of the vehicle acceleration (as shown by ④'), and thereby maintain the feel of acceleration to meet the driver's accelerating intention.

When accelerator operation quantity APO is small, the control system according to the fourth embodiment performs the kickdown acceleration in the same manner.

When, during a vehicle running operation at operating point A in FIG. 29, the driver performs a kickdown operation by depressing the accelerator pedal to a small opening degree, then the control system sets the downshift quantity equal to an amount ① shown in FIG. 28A, and starts the downshift operation to the target input shaft speed DsrRev (or target transmission ratio Dratio) which is set at an operating point b shown in FIG. 29 reached by a shift by the amount ① to the Lo side to decrease the speed ratio.

When the actual transmission ratio reaches point b, the control system sets the initial upshift quantity UP_ratio(0) at the accelerator operation quantity of the small opening by using the vehicle speed V0 at the time point of the kickdown operation, and starts the upshift operation.

In the upshift mode, the control system updates the subsequent upshift quantity UP_ratio(n) in each control cycle in accordance with an increase in the current vehicle speed VSP, and thereby determines the upshift quantity from the difference between the initial upshift quantity UP_ratio (0) and the subsequent upshift quantity UP_ratio(n) at the vehicle speed of V(n), as shown by an amount ③ in FIG. 28B.

Upshift Quantity=UP_ratio(0)−UP_ratio(*n*)

By this upshift quantity ③, the control system sets a new target input shaft speed DserRev at a point c shown in FIG. 29, and performs the upshift operation. As shown in FIG. 29, this point c is an intersection point between a sloping broken line (determining a target transmission ratio Dratio) which is shifted to the Hi side, from a sloping broken line of the downshift transmission ratio DW_ratio(0) passing through point b, by the upshift amount ③; and the vertical broken line at vehicle speed value V(n).

In this way, in the kickdown operation at the small accelerator opening degree, the control system controls the transmission ratio of CVT 10 along a virtual shift line 114*b* shown in FIG. 29, without constraint of the shift lines in the normal shift map 121. By so doing, the control system restrains an increase of the engine speed to prevent undesired increase of noises, increases the vehicle acceleration quietly and quickly, restrains a decrease of the vehicle acceleration after its peak, and thereby maintain the feel of acceleration to meet the driver's accelerating intention.

If the drivers depresses the accelerator pedal further or release the pedal, and hence the accelerator operation quantity APO is varied during the upshift mode, the control system can determine the subsequent upshift quantity UP_ratio(n) adequately in compliance with the variation of accelerator operation quantity APO, by selecting one of shift lines in FIG. 27B in accordance with APO or by interpolation from two adjacent shift lines. Therefore, the control system according to the fourth embodiment can continue the kickdown acceleration faithfully in accord with the driver's accelerating intention.

In this way, the control system according to the fourth embodiment performs the downshift operation with a downshift quantity of the virtual shift line corresponding to APO, determined by downshift quantity determining map 111, while preventing an excessive increase in the engine speed. After the downshift operation, the control system performs the upshift operation gradually by periodically updating the upshift quantity of the virtual shift line corresponding to vehicle speed VSP and accelerator operation quantity APO, determined by upshift quantity determining map 112. Thus, without receiving constraint from the shift lines in shift map 121, the control system can achieve desirable accelerating response and continuation so as to satisfy the driver's intention, and adjust the upshift quantity optimally in accordance with changes in accelerator operation quantity APO, to respond faithfully to the driver's accelerating intention.

Figure 31B:
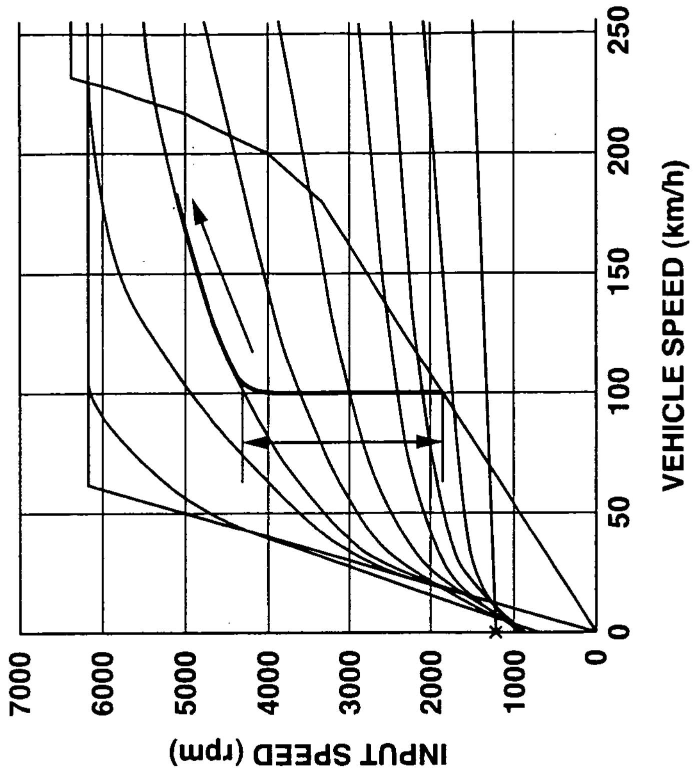
FIGS. 31A and 31B are views of a shift map for illustrating vehicle start acceleration and kickdown acceleration when performed by using a normal shift map.
Figure 31A:
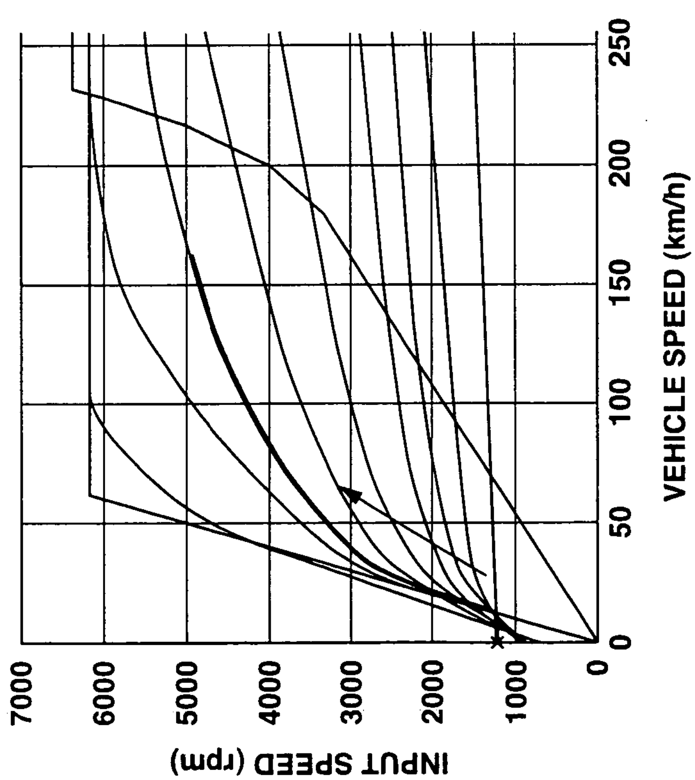

By contrast to the embodiments of the present invention, the shift control system disclosed in the before-mentioned Published Japanese Patent Application Publication (KOKAI) No. H04(1992)-54371 has a (normal) shift map adapted to provide satisfactory acceleration in the case of vehicle start as shown in FIG. 31A. In the case of a reaccelerating operation such as a kickdown operation, as shown in FIG. 31B, the downshift quantity becomes excessive, and the engine speed increases excessively. There is involved a considerable time lag until the attainment of acceleration as expected by the driver.

Step S2 (or section 102) corresponds to means for detecting a driver's kickdown acceleration request by monitoring variation of an accelerator operation condition. Sensor 5 can serve as means for detecting the driver's kickdown acceleration request. Step S20 (or section 120) corresponds to means for controlling an actual transmission ratio of the continuously-variable transmission in a normal mode when the kickdown acceleration request is absent. At least one of S8, S10, S12, S29, S32, S51, S60, S78, S79 and S80 (or section 110) corresponds to means for determining a kickdown-mode downshift characteristic and a kickdown-mode upshift characteristic in accordance with a driver's acceleration demand. At least one of steps S14 and S15 corresponds to means for controlling the actual transmission ratio of the continuously-variable transmission in a kickdown mode in response to the kickdown acceleration request. In the second and third embodiments, controller (1) is configured to modify at least one of the downshift operation and the upshift operation in the second (kickdown) mode in accordance with a running resistance parameter (such as θ or eVSP) representing a vehicle running resistance of the vehicle.

This application is based on four prior Japanese Patent Applications No. 2002-329138 filed on Nov. 13, 2002; No. 2002-329139, filed on Nov. 13, 2002; No. 2002-329140, filed on Nov. 13, 2002; and No. 2002-354810, filed on Dec. 6, 2002. The entire contents of these Japanese Patent Applications Nos. 2002-329138; No. 2002-329139; No. 2002-329140; and No. 2002-354810 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift control apparatus comprising:

a continuously-variable transmission;

a sensing section to sense a vehicle speed of a vehicle and an accelerator operation condition of the vehicle; and a controller to control an actual transmission ratio of the continuously-variable transmission normally in a first mode in accordance with the vehicle speed and accelerator operation condition, to produce a rapid acceleration request signal by monitoring an accelerator operation speed determined from the accelerator operation condition, to control the actual transmission ratio of the continuously-variable transmission in a second mode in response to the rapid acceleration request signal, by varying a target transmission ratio, to determine a second-mode downshift characteristic and a second-mode upshift characteristic in accordance with the accelerator operation condition, and to control the actual transmission ratio of the continuously-variable transmission in the second mode in response to the rapid acceleration request signal by performing a downshift operation to a target downshift transmission ratio determined according to the second-mode downshift characteristic and an upshift operation according to the second mode upshift characteristic.

2. The shift control apparatus as claimed in claim 1, wherein the second-mode downshift characteristic is a shift characteristic to restrain a shift quantity as compared to a first-mode shift characteristic used in the first mode; and wherein the controller is configured to control the actual transmission ratio of the continuously-variable transmission normally in the first mode to increase a speed ratio of the continuously-variable transmission as the vehicle speed increases and to decrease the speed ratio as an accelerator operation quantity increases, the speed ratio being a ratio designating an output speed of the transmission divided by an input speed of the transmission.

3. The shift control apparatus as claimed in claim 1, wherein the controller is configured to determine the second-mode downshift characteristic and the second-mode upshift characteristic in accordance with a driver's accelerator demand determined in accordance with the accelerator operation condition.

4. The shift control apparatus as claimed in claim 3, wherein the controller is configured to determine the second-mode downshift characteristic by selecting at least one from a plurality of predetermined downshift characteristics in accordance with the accelerator demand, and to determine the second-mode upshift characteristic by selecting at least one from a plurality of predetermined upshift characteristics in accordance with the accelerator demand.

5. The shift control apparatus as claimed in claim 3, wherein the second-mode upshift characteristic is a characteristic to determine an upshift quantity that is a quantity by which the transmission ratio is decreased with increase in the vehicle speed after the downshift operation.

6. The shift control apparatus as claimed in claim 5, wherein the second-mode upshift characteristic is a characteristic to decrease the upshift quantity as the accelerator demand increases.

7. The shift control apparatus as claimed in claim 6, wherein the controller is configured to determine an accelerator operation quantity from the accelerator operation condition, and the second-mode downshift characteristic is a characteristic to increase a downshift quantity as the accelerator demand increases, the accelerator demand being a parameter representing a driver's intention of acceleration, determined from at least the accelerator operation quantity.

8. The shift control apparatus as claimed in claim 5, wherein the second-mode downshift characteristic is a characteristic to decrease a downshift quantity as the accelerator demand decreases, and the second-mode upshift characteristic is a characteristic to increase the upshift quantity as the accelerator demand decreases.

9. The shift control apparatus as claimed in claim 5, wherein the second-mode downshift characteristic is a characteristic to decrease a downshift quantity as the vehicle speed increases.

10. The shift control apparatus as claimed in claim 5, wherein the second-mode upshift characteristic is a characteristic of a desired transmission ratio decreasing with increase in the vehicle speed, and the rate of decrease of the desired transmission ratio of the second-mode upshift characteristic with respect to increase in the vehicle speed is greater when the acceleration demand is equal to a smaller value than when the accelerator demand is equal to a greater value greater than the smaller value.

11. The shift control apparatus as claimed in claim 1, wherein the controller is configured to produce the rapid acceleration request signal by monitoring an accelerator operation speed determined from the accelerator operation condition, and to control the actual transmission ratio of the continuously-variable transmission in the second mode in response to the rapid acceleration request signal; and wherein the controller is configured to determine a reference operation speed in accordance with an accelerator operation quantity determined from the accelerator operation condition and the vehicle speed, and to produce the rapid acceleration request signal when the acceleration operation speed is higher than the reference operation speed.

12. The shift control apparatus as claimed in claim 1, wherein the controller is configured to detect a kickdown operation by monitoring the accelerator operation condition, to produce the rapid acceleration request signal upon detection of the kickdown operation, and to control the actual transmission ratio of the continuously-variable transmission in the second mode in response to the rapid acceleration request signal; and wherein the controller is configured to determine the target downshift transmission ratio from the vehicle speed at the time of the rapid acceleration request signal according to the second-mode downshift characteristic; to perform the downshift operation to the target downshift transmission ratio; to determine an initial upshift quantity from the vehicle speed at the time of the rapid acceleration request signal according to the second-mode upshift characteristic; and to start the upshift operation in accordance with the initial upshift quantity after the downshift operation.

13. The shift control apparatus as claimed in claim 1, wherein the controller is configured to determine an accelerator operation quantity and an accelerator operation speed from the accelerator operating condition, and to determine the acceleration demand in accordance with the accelerator operation quantity and the accelerator operation speed.

14. The shift control apparatus as claimed in claim 1, wherein the controller is configured to modify at least one of the downshift operation and the upshift operation in the second mode in accordance with a running resistance parameter representing a vehicle running resistance of the vehicle.

15. The shift control apparatus as claimed in claim 14, wherein the controller is configured to modify the target downshift transmission ratio of the downshift operation in accordance with the running resistance parameter.

16. The shift control apparatus as claimed in claim 15, wherein the shift control apparatus further comprises a running resistance sensor to sense a vehicle operating condition to determine the running resistance parameter.

17. The shift control apparatus as claimed in claim 15, wherein the controller is configured to increase the target downshift transmission ratio as the running resistance increases.

18. The shift control apparatus as claimed in claim 17, wherein the running resistance sensor is arranged to sense a road gradient, and the controller is configured to increase the target downshift transmission ratio as the road gradient increases.

19. The shift control apparatus as claimed in claim 1, wherein the controller is configured to check an accelerating condition after the downshift operation in the second mode, and to modify a target upshift transmission ratio in the upshift operation in the second mode to a downshift side in accordance with the accelerating condition.

20. The shift control apparatus as claimed in claim 19, wherein the controller is configured to determine a look-ahead vehicle speed from a driving force calculated from an engine output torque and a predetermined running resistance; to determine a vehicle speed deviation between the look-ahead vehicle speed and the vehicle speed; and to determine the accelerating condition in accordance with the vehicle speed deviation.

21. The shift control apparatus as claimed in claim 20, wherein the controller is configured to increase a correction quantity to modify the target upshift transmission ratio to the downshift side as the vehicle speed deviation becomes greater.

22. The shift control apparatus as claimed in claim 4, wherein the controller is configured to determine the target downshift transmission ratio by interpolation from a plurality of the predetermined downshift characteristics; and wherein the controller is configured to determine an upshift quantity by interpolation from a plurality of the predetermined upshift characteristics.

23. The shift control apparatus as claimed in claim 22, wherein the controller is configured to select two of the predetermined downshift characteristics in accordance with the accelerator demand, and to determine the target downshift transmission ratio from the two of the predetermined downshift characteristics in accordance with the vehicle speed; and wherein the controller is configured to select two of the predetermined upshift characteristics in accordance with the accelerator demand, and to determine the upshift quantity from the two of the predetermined upshift characteristics in accordance with the vehicle speed.

24. The shift control apparatus as claimed in claim 22, wherein each of the predetermined downshift characteristics is a shift line which is arranged to determine a target variable representing one of a target transmission ratio and a target transmission input shaft speed, from the vehicle speed and which corresponds to a unique one of discrete levels of the accelerator demand which is an accelerator operation quantity determined from the accelerator operation condition; and wherein each of the predetermined upshift characteristics is a shift line which is arranged to determine the target variable from the vehicle speed and which corresponds to a unique one of discrete levels of the accelerator demand.

25. The shift control apparatus as claimed in claim 1, wherein the controller is configured to determine the target downshift transmission ratio from the vehicle speed according to the second-mode downshift characteristic determined in accordance with the accelerator operation condition, to determine a target upshift transmission ratio from the vehicle speed according to the second-mode upshift characteristic determined in accordance with the accelerator operation condition, to perform the downshift operation to the target downshift transmission ratio in response to a kickdown operation, and to perform the upshift operation in accordance with the target upshift transmission ratio along a virtual shift line after the downshift operation.

26. A shift control process for a continuously-variable transmission, the shift control process comprising:

producing a rapid acceleration request signal by monitoring an accelerator operation speed determined from a sensed accelerator operation condition;

controlling an actual transmission ratio of the continuously-variable transmission normally in a first mode in accordance with a sensed vehicle speed and an accelerator operation quantity determined from the sensed accelerator operation condition when the rapid acceleration request signal is absent;

determining a second-mode downshift characteristic and a second-mode upshift characteristic in accordance with the accelerator operation condition, and controlling the actual transmission ratio of the continuously-variable transmission in a second mode in response to the rapid acceleration request signal, by varying a target transmission ratio, by performing a downshift operation to the target downshift transmission ratio determined according to the second-mode downshift characteristic and an upshift operation according to the second mode upshift characteristic.

27. A shift control apparatus for a continuously-variable transmission, the shift control apparatus comprising:

means for detecting a driver's kickdown acceleration request by monitoring variation of an accelerator operation condition;

means for controlling an actual transmission ratio of the continuously-variable transmission in a normal mode in accordance with a sensed vehicle speed and a sensed accelerator operation quantity determined from the sensed accelerator operation condition when the kickdown acceleration request is absent;

means for producing a rapid acceleration request signal by monitoring an accelerator operation speed determined from the accelerator operation condition, means for controlling the actual transmission ratio of the continuously-variable transmission in a kickdown mode in response to the rapid acceleration request signal, by varying a target transmission ratio, means for determining a kickdown-mode downshift characteristic and a kickdown-mode upshift characteristic in accordance with a driver's acceleration demand estimated by the sensed accelerator operation quantity, and means for controlling the actual transmission ratio of the continuously-variable transmission in a kickdown mode in response to the kickdown acceleration request signal, by performing a downshift operation to a target downshift transmission ratio determined according to the kickdown-mode downshift characteristic and an upshift operation according to the kickdown-mode upshift characteristic.

* * * * *